(12) United States Patent
Shibata et al.

(10) Patent No.: US 12,212,268 B2
(45) Date of Patent: Jan. 28, 2025

(54) MOTOR CONTROL DEVICE

(71) Applicant: DENSO CORPORATION, Kariya (JP)

(72) Inventors: Yusuke Shibata, Kariya (JP); Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 123 days.

(21) Appl. No.: 18/186,858

(22) Filed: Mar. 20, 2023

(65) Prior Publication Data

US 2023/0231498 A1 Jul. 20, 2023

Related U.S. Application Data

(63) Continuation of application No. PCT/JP2021/033090, filed on Sep. 9, 2021.

(30) Foreign Application Priority Data

Sep. 23, 2020 (JP) .................. 2020-158966

(51) Int. Cl.
| | |
|---|---|
| *H02P 3/12* | (2006.01) |
| *B60L 50/51* | (2019.01) |
| *H02M 7/5395* | (2006.01) |
| *H02P 5/505* | (2016.01) |
| *H02P 5/68* | (2006.01) |

(52) U.S. Cl.
CPC .............. *H02P 5/68* (2013.01); *B60L 50/51* (2019.02); *H02M 7/5395* (2013.01)

(58) Field of Classification Search
CPC ...... B60L 3/003; B60L 15/2009; B60L 7/003; B60L 50/51; B60L 2240/423; B60L 2240/421; B60L 2220/42; B60L 2240/461; B60L 2240/12; B60L 2240/429; H02P 3/12; H02P 29/027; H02P 5/505; H02P 5/68; H02P 5/46; H02P 7/04; H02P 29/68; H02M 1/009; H02M 7/5395; H02M 3/158
USPC ............................................. 318/53
See application file for complete search history.

(56) References Cited

U.S. PATENT DOCUMENTS

| | | | |
|---|---|---|---|
| 2011/0074333 A1* | 3/2011 | Suzuki | B62D 5/0487 |
| | | | 318/724 |
| 2013/0060409 A1* | 3/2013 | Matsushita | B60W 10/184 |
| | | | 180/65.23 |
| 2015/0134121 A1 | 5/2015 | Fukuda | |
| 2016/0043669 A1 | 2/2016 | Fukuda et al. | |
| 2016/0315570 A1* | 10/2016 | Hayashi | H02P 7/04 |
| 2017/0257055 A1* | 9/2017 | Kitaori | B60W 30/1843 |
| 2019/0084426 A1* | 3/2019 | Tanaka | B60L 7/22 |
| 2021/0067080 A1* | 3/2021 | Endo | H02P 6/16 |

* cited by examiner

*Primary Examiner* — Gabriel Agared
(74) *Attorney, Agent, or Firm* — Maschoff Brennan

(57) ABSTRACT

A motor control device drives first and second motors for outputting torque in braking or non-braking direction in a vehicle brake device, includes: an electric power converter that includes first to third legs having positive and negative switch elements; and a control unit. When the control unit energizes from the positive switch element of the first or third leg to the negative switch element of the second leg, the first and second motors output the torque in a same direction. When an absolute value of current flowing or estimated to flow in at least one of the first motor and the second motor exceeds a current threshold, the control unit drives the positive and negative switch elements of the second leg.

13 Claims, 18 Drawing Sheets

2ND EMB

1ST CAT ARRANGE EX

1ST CAT ARRANGE EX

2ND CAT ARRANGE EX

2ND CAT ARRANGE EX

2ND CAT ARRANGE EX

OTHER ARRANGE EX (1)

OTHER ARRANGE EX (2)

OTHER ARRANGE EX (3)

OTHER ARRANGE EX (4)

OTHER ARRANGE EX (5)

OTHER ARRANGE EX (6)

OTHER ARRANGE EX (7)

3RD EMB

FOURTH EMB

_US 12,212,268 B2_

1

MOTOR CONTROL DEVICE

CROSS REFERENCE TO RELATED APPLICATIONS

The present application is a continuation application of International Patent Application No. PCT/JP2021/033090 filed on Sep. 9, 2021, which designated the U.S. and claims the benefit of priority from Japanese Patent Application No. 2020-158966 filed on Sep. 23, 2020. The entire disclosures of all of the above applications are incorporated herein by reference.

TECHNICAL FIELD

The present disclosure relates to a motor control device.

BACKGROUND

Conventionally, devices are known for controlling the energization of two DC motors used in a set. For example, in the devices according to a conceivable technique, one half bridge circuit of the H bridge circuit corresponding to each DC motor is shared, and the power converter is configured by three half bridge circuits.

SUMMARY

According to an example, a motor control device drives first and second motors for outputting torque in braking or non-braking direction in a vehicle brake device, may include: an electric power converter that includes first to third legs having positive and negative switch elements; and a control unit. When the control unit energizes from the positive switch element of the first or third leg to the negative switch element of the second leg, the first and second motors output the torque in a same direction. When an absolute value of current flowing or estimated to flow in at least one of the first motor and the second motor exceeds a current threshold, the control unit drives the positive and negative switch elements of the second leg.

BRIEF DESCRIPTION OF THE DRAWINGS

The above and other objects, features and advantages of the present disclosure will become more apparent from the following detailed description made with reference to the accompanying drawings. In the drawings.

2

Figure 9:
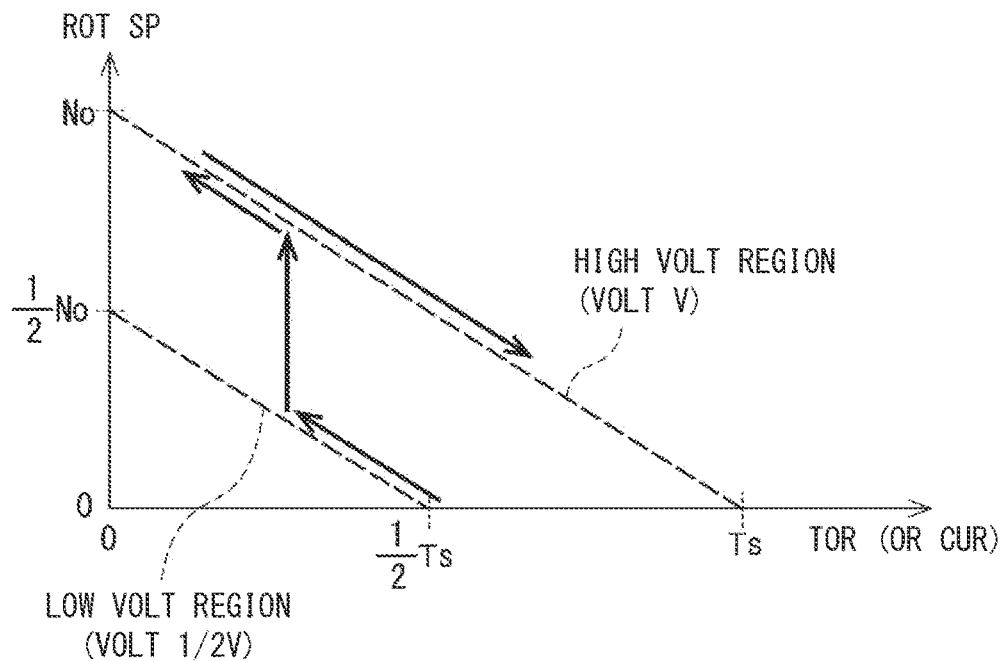
Figure 10:
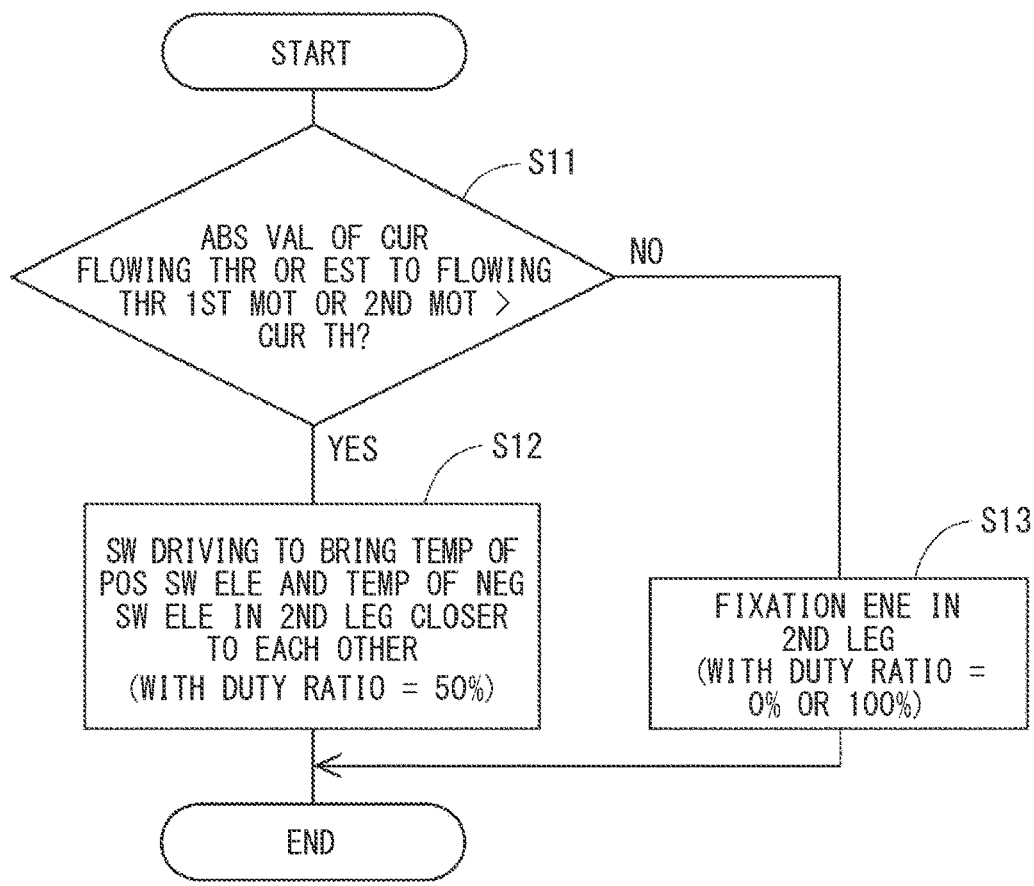
Figure 11:
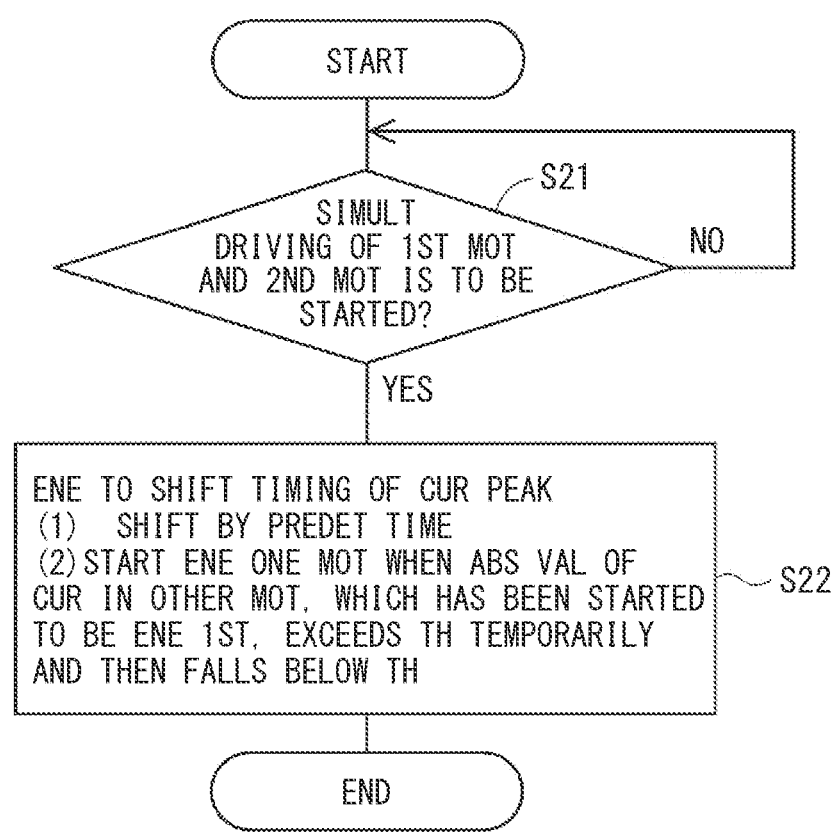
Figure 12:
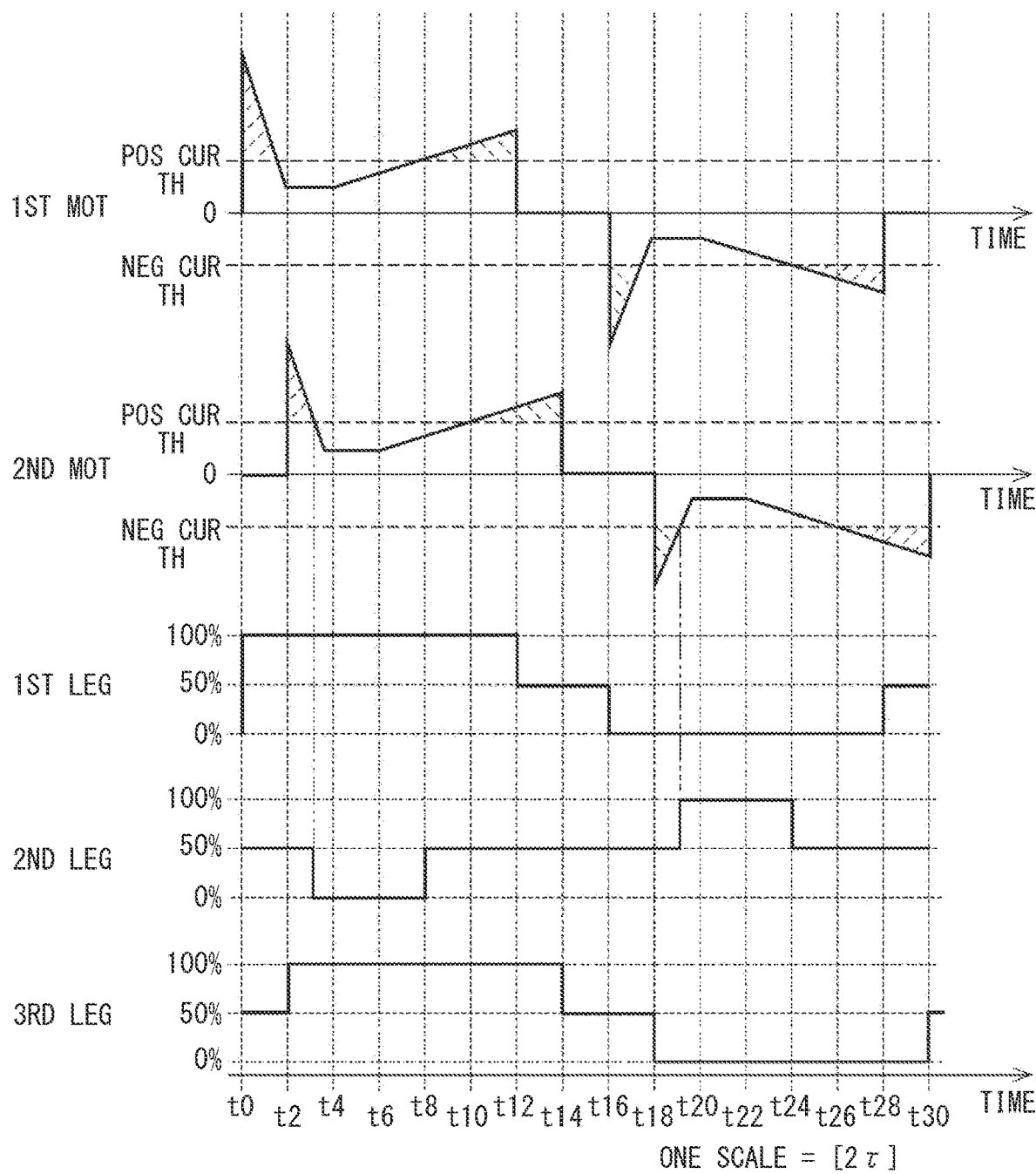
Figure 13A:
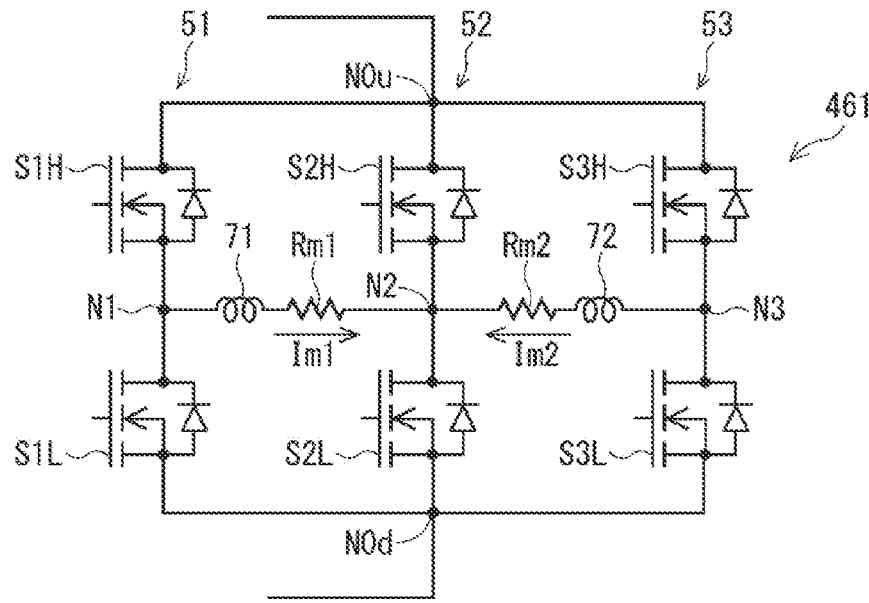
Figure 13B:
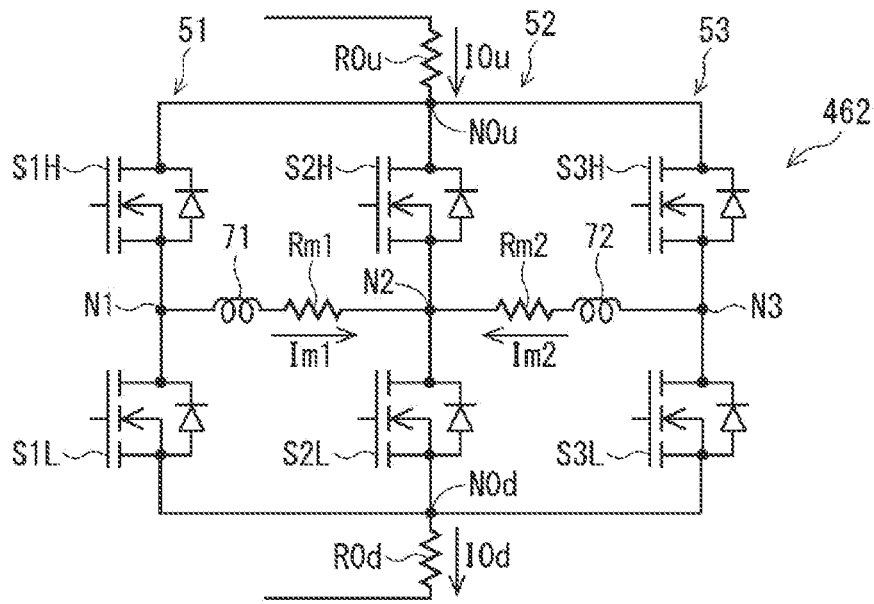
Figure 14A:
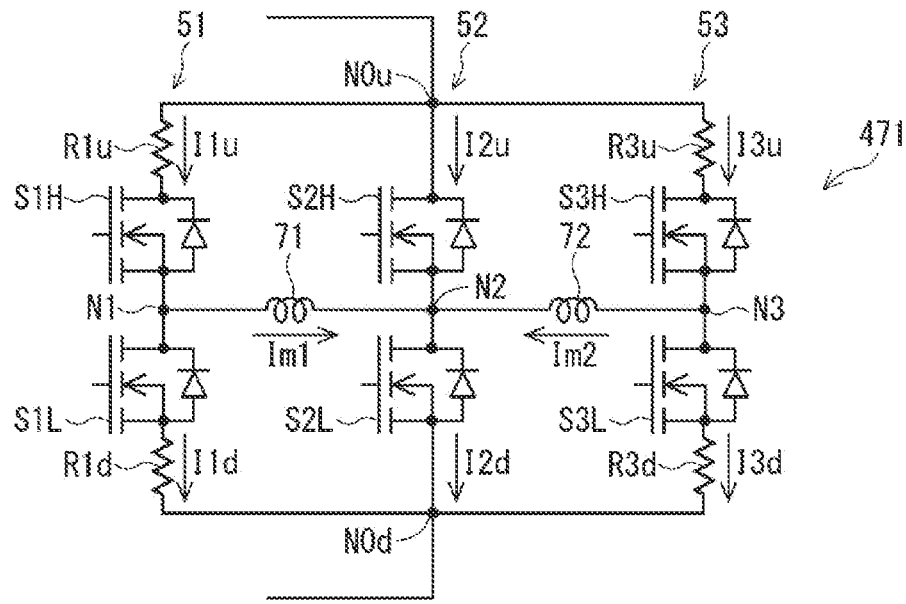
Figure 14B:
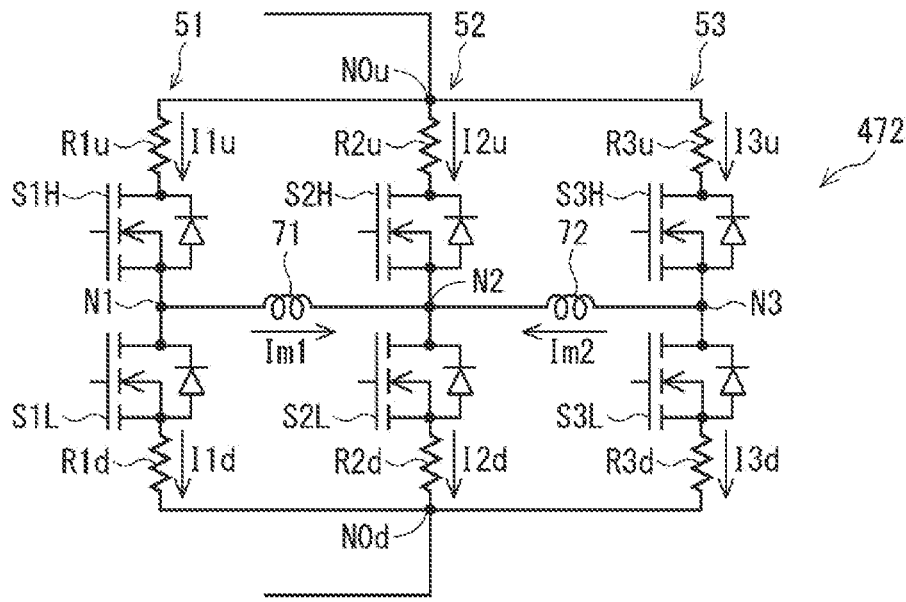
Figure 14C:
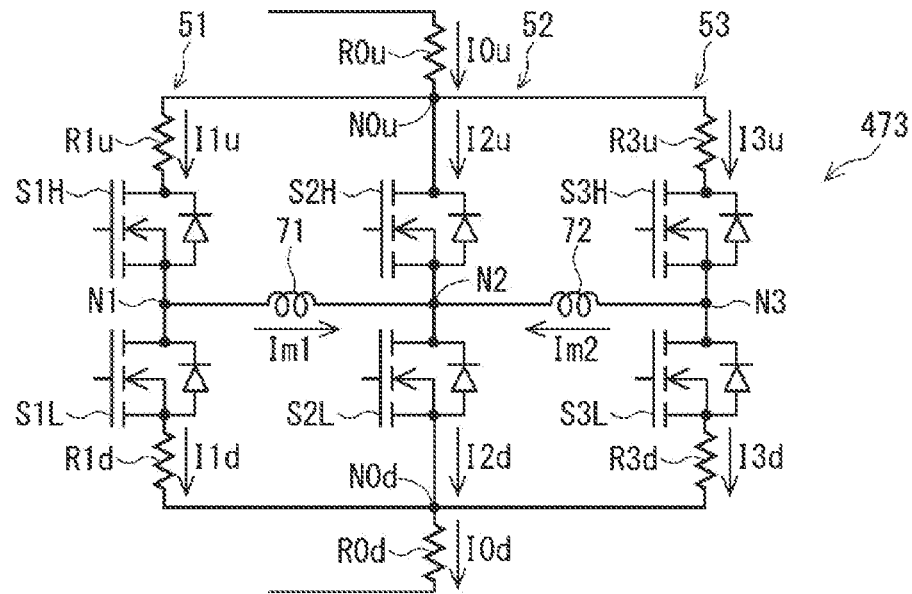
Figure 15A:
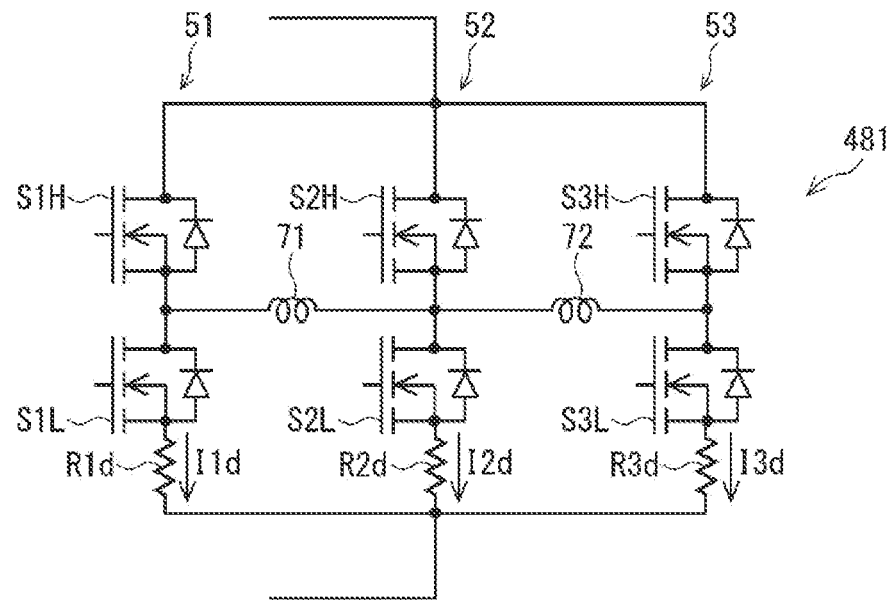
Figure 15B:
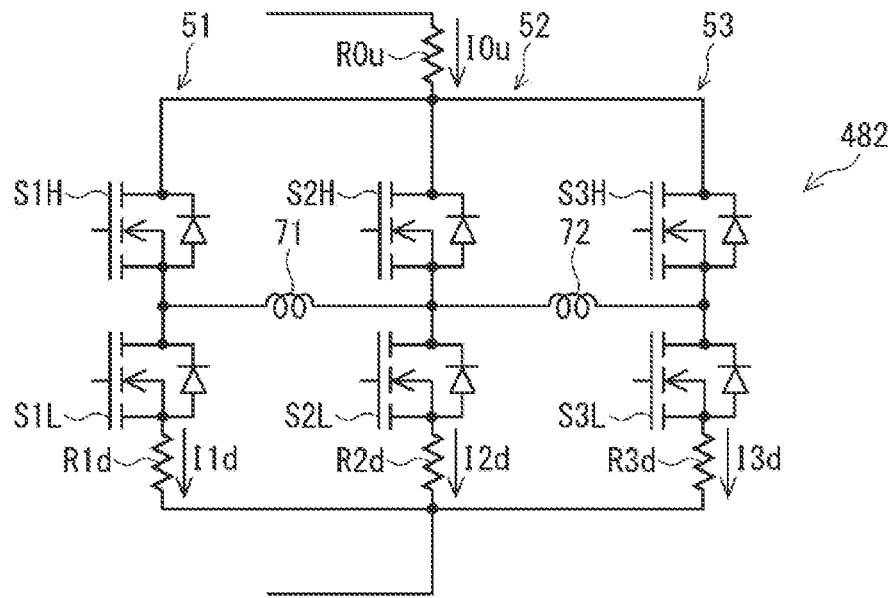
Figure 16A:
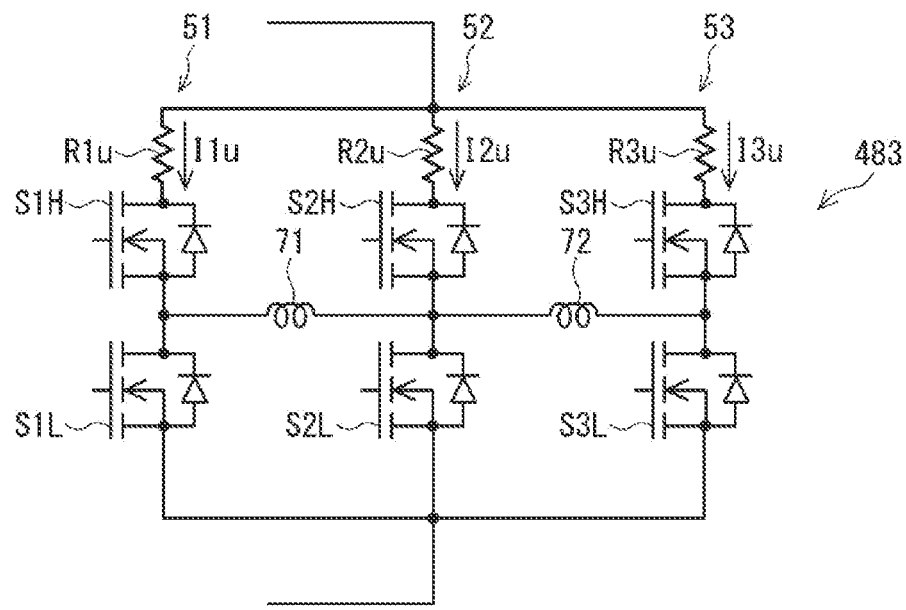
Figure 16B:
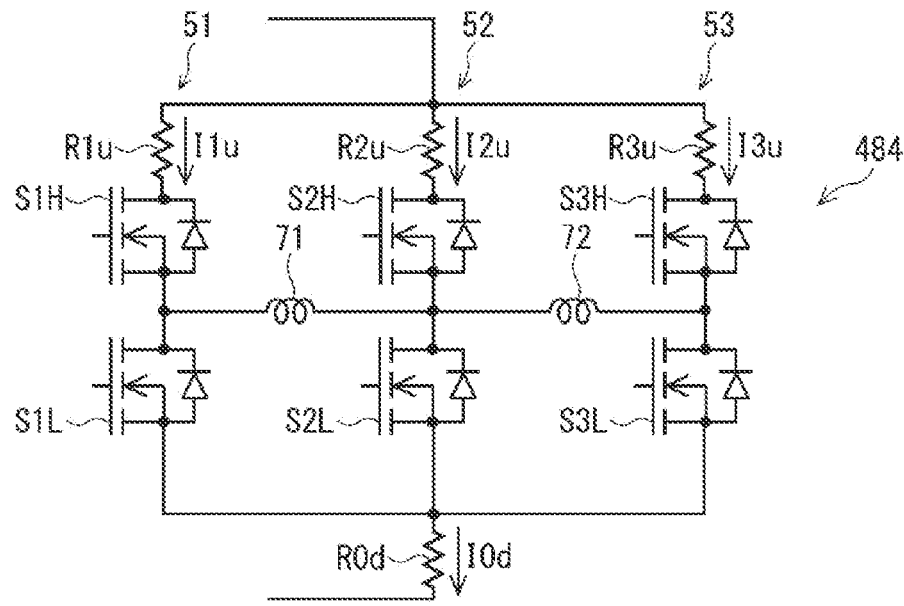
Figure 17A:
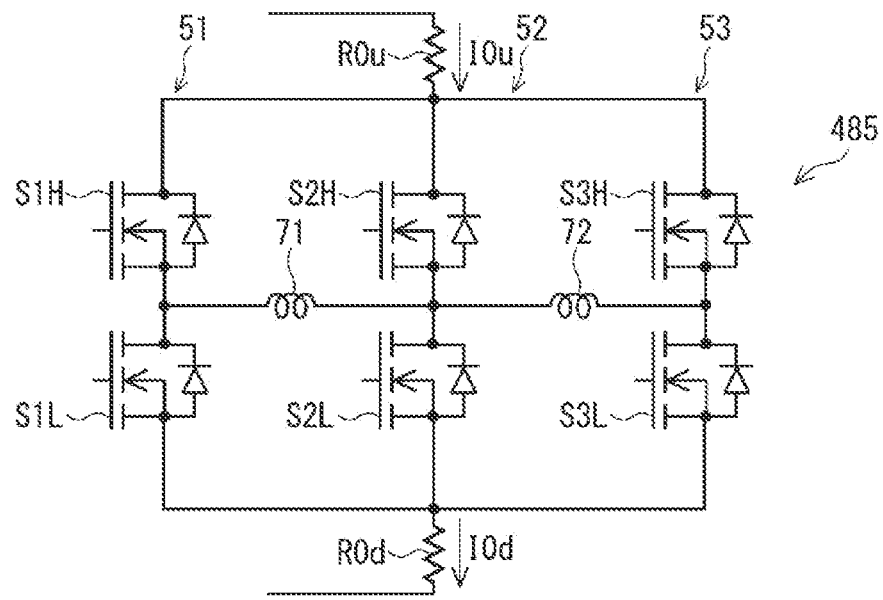
Figure 17B:
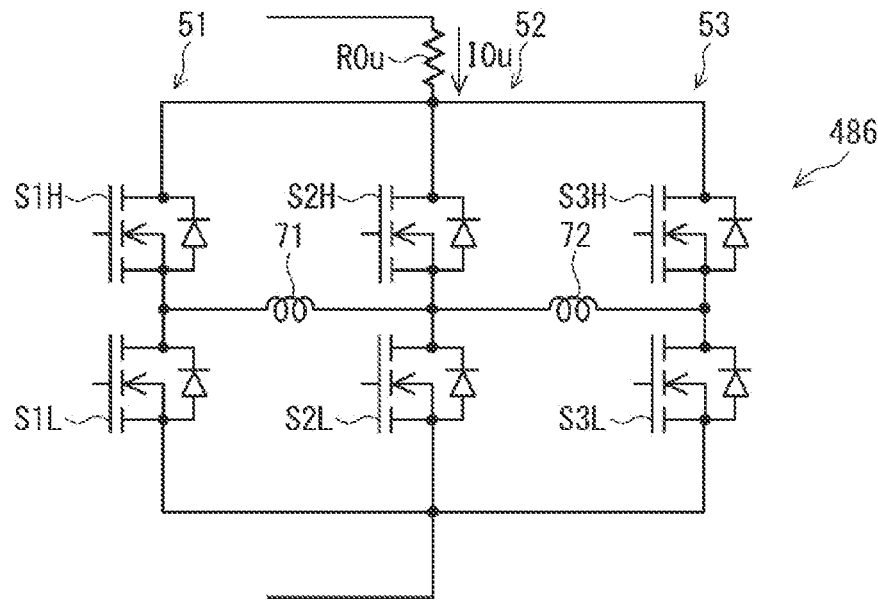
Figure 17C:
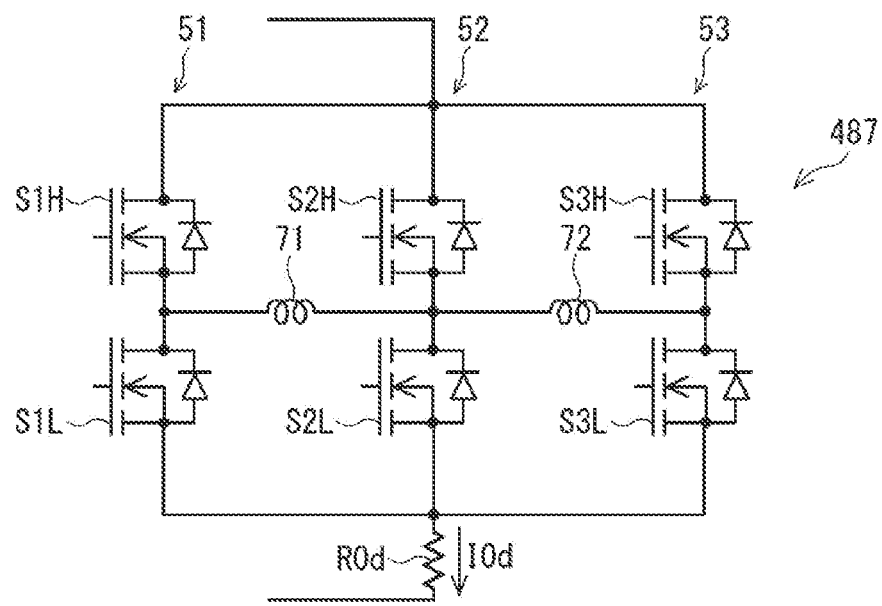
Figure 18:
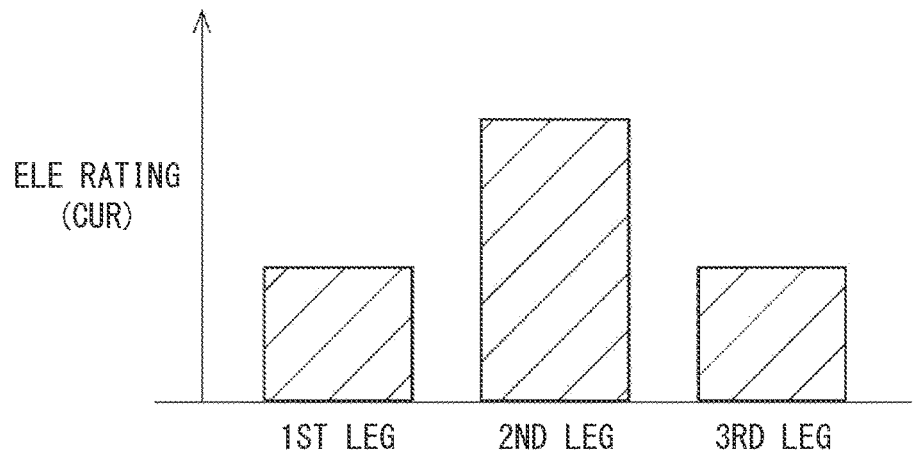
Figure 19:
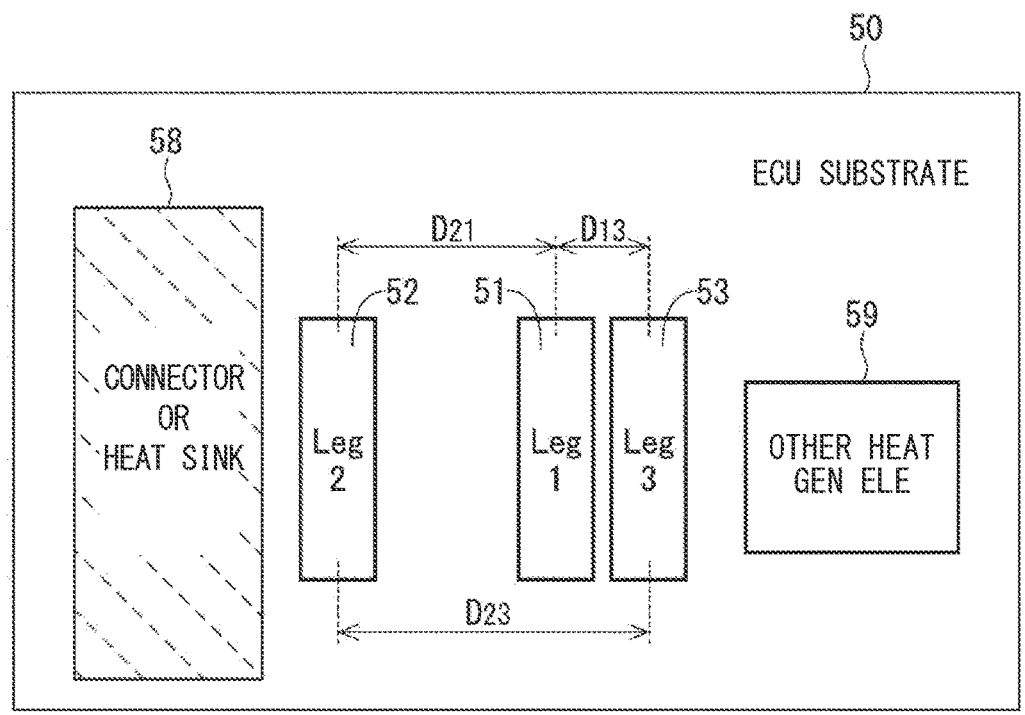

FIG. 9 is a diagram showing the relationship between the applied voltage for energizing the motor and the torque-rotation speed characteristic;

FIG. 10 is a flowchart (1) of an energization method according to the first embodiment;

FIG. 11 is a flowchart (2) of an energization method according to the first embodiment;

FIG. 12 is a time chart showing an energization method according to the second embodiment;

FIG. 13A is a diagram showing a first category arrangement example of shunt resistors;

FIG. 13B is a diagram showing a first category arrangement example of shunt resistors;

FIG. 14A is a diagram showing a second category arrangement example of shunt resistors;

FIG. 14B is a diagram showing a second category arrangement example of shunt resistors;

FIG. 14C is a diagram showing a second category arrangement example of shunt resistors;

FIG. 15A is a diagram showing another arrangement example (1) of shunt resistors;

FIG. 15B is a diagram showing another arrangement example (2) of shunt resistors;

FIG. 16A is a diagram showing another arrangement example (3) of shunt resistors;

FIG. 16B is a diagram showing another arrangement example (4) of shunt resistors;

FIG. 17A is a diagram showing another arrangement example (5) of shunt resistors;

FIG. 17B is a diagram showing another arrangement example (6) of shunt resistors;

FIG. 17C is a diagram showing another arrangement example (7) of shunt resistors;

FIG. 18 is a diagram comparing element ratings for each leg according to the third embodiment; and FIG. 19 is a diagram showing substrate arrangement according to the fourth embodiment.

DETAILED DESCRIPTION

A set of a pair of a positive side (or upper arm) switching element and a negative side (or lower arm) switching element corresponding to the "half bridge circuit" according to the conceivable technique is referred to as a "leg" in this specification. The three-leg bridge circuits disclosed in Patent Literatures 1 and 2 includes one shared leg and two unshared legs. In the three-leg bridge circuit, the number of switch elements is reduced from eight to six compared to two H-bridge circuits. Also, the circuit area of the power converter is reduced.

However, when two motors are energized at the same time, a larger current flows through the shared leg than the non-shared leg, so there may be a risk of failure due to heat generation.

The present embodiments provide a motor control device that reduces heat generation in a shared leg in a configuration in which one leg of a bridge circuit is shared by two DC motors.

A motor control device according to the present embodiments drives a first motor and a second motor that output torque in a braking direction or a non-braking direction in accordance with the direction of energization in a vehicle braking device. This motor control device includes a power converter and a control unit.

The power converter is accommodated in one casing and has three legs, a first leg, a second leg, and a third leg, which are connected in parallel between a positive terminal and a negative terminal of the DC power supply. In each leg, a positive side switch element connected to the positive terminal and a negative side switch element connected to the negative terminal are connected in series via an inter-element connection point. The power converter can convert the electric power of the DC power supply and supply the converted power to the first motor and the second motor. The control unit operates the positive side switch element and the negative side switch element of each leg to control energization of the first motor and the second motor.

The inter-element connection point of the first leg is connected to one terminal of the first motor. The inter-element connection point of the third leg is connected to one terminal of the second motor. The inter-element connection point of the second leg is connected to the other terminal of the first motor and to the other terminal of the second motor. That is, the second leg is a shared leg, and the first and third legs are non-shared legs.

When the control unit energizes the positive side switch element of the first leg to the negative side switch element of the second leg and energizes the positive side switch element of the third leg to the negative side switch element of the second leg, the first The motor and the second motor are configured to output torque in the same direction, either the braking direction or the non-braking direction.

When the absolute value of the current flowing or estimated to flow in at least one of the first motor and the second motor exceeds the current threshold, the control unit switches and drives the positive side switch element and the negative side switch element of the second leg. The "current estimated to flow" means current expected based on circuit specifications and experimental data, or future current expected from changes in current detection values from the past to the present.

In the present embodiments, one of the positive side switch element or the negative side switch element of the second leg is not always in an on state, but is switching and driven so that the return current flows. As a result, even if the maximum instantaneous current does not change, the flowing current is shared temporally by both switch elements, so that heat generation per element can be reduced.

A motor control device according to the present disclosure will be described with reference to plural embodiments based on the drawings. The motor control device of this embodiment functions as an "electric parking brake motor control device" that drives two electric parking brake motors for locking the right and left rear wheels when the vehicle is parked.

[Overall Configuration of Brake Device]

First, with reference to FIGS. 1 and 2, the overall construction of a vehicle braking system will be described. The brake device 90 has an "electric hydraulic control function" and an "electric parking brake function". In the automotive technical field, "Electric Hydraulic Control" is commonly known as "ESC" or control related to Electric Stabilization Control. In addition to braking control in a narrow sense, stabilization control may include antilock brake control, vehicle behavior stabilization control, slope start assist control, traction control, vehicle following control, lane departure avoidance control, obstacle avoidance control, and the like. The electric parking brake (hereinafter "EPB") function is a function that locks the wheels when the vehicle is parked.

Figure 1:
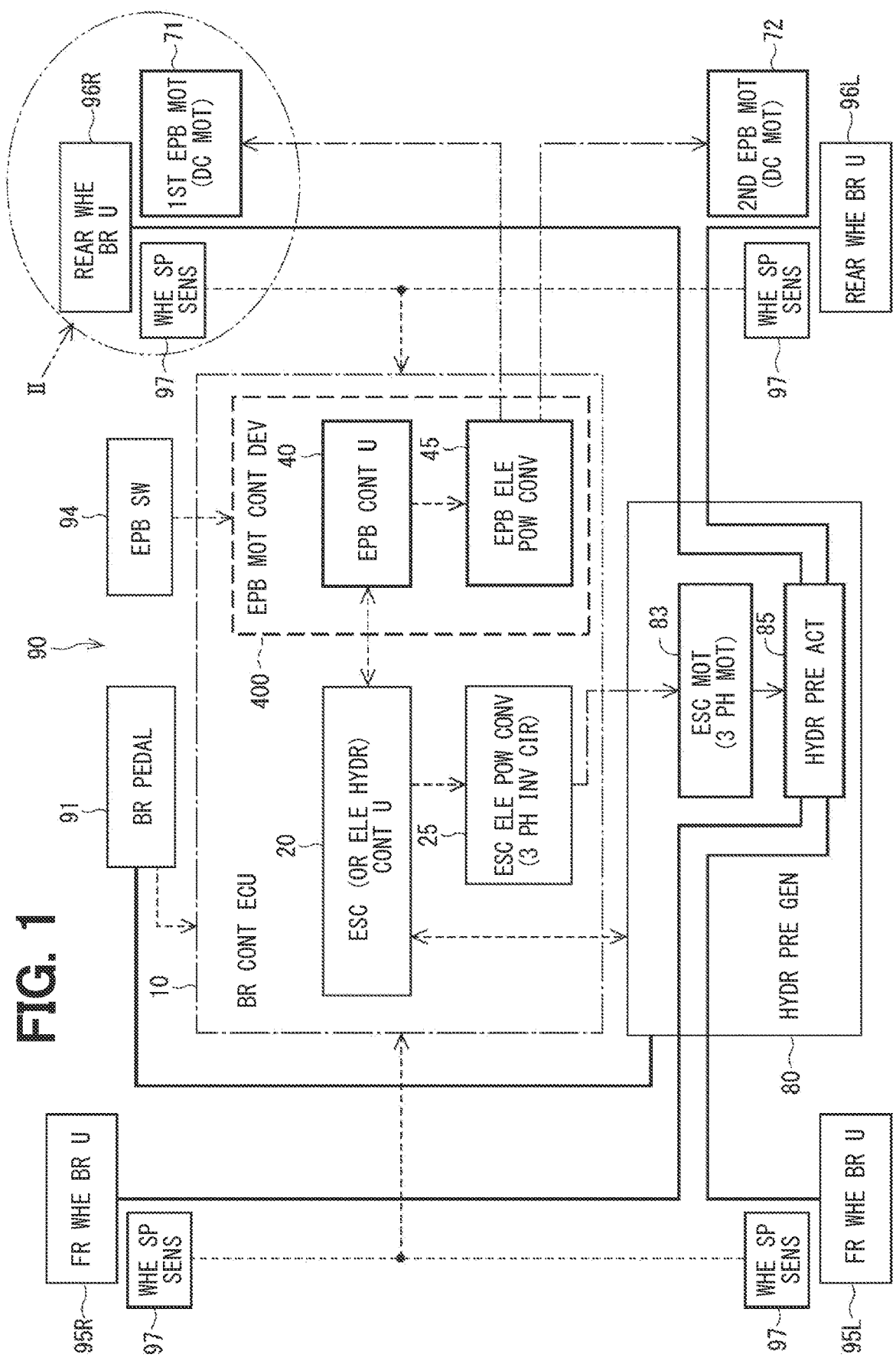
FIG. 1 is an overall configuration diagram of a vehicle brake device to which a motor control device of the present embodiment is applied.

As shown in FIG. 1, the brake device 90 includes a brake control ECU 10, a hydraulic pressure generator 80, a brake pedal 91, an EPB switch 94, brake units 95R, 95L, 96R, and 96L for each wheel, a wheel speed sensor 97, and the like.

In the so-called "motor-on-caliper type" brake device shown in FIG. 1, two EPB motors 71 and 72 are provided, one for each of the right and left rear wheels.

In FIG. 1, thick solid lines indicate hydraulic pressure paths, and dashed arrows indicate electrical signals. When the brake pedal 91 is stepped on, hydraulic pressure is supplied to the hydraulic pressure generator 80 and an electric signal is transmitted to the brake control ECU 10. When the EPB switch 94 is operated, an electric signal is sent to the EPB motor control device 400 in the brake control ECU 10.

The brake control ECU 10 includes an ESC (electric hydraulic pressure) control unit 20 and an ESC power converter 25 as components related to electric hydraulic pressure control. The ESC control unit 20 rotates the ESC motor 83 by power supply from the ESC electric power converter 25 to drive the hydraulic pressure actuator 85, thereby controlling the brake hydraulic pressure of the hydraulic pressure generator 80. The hydraulic pressure is typically oil pressure, and the hydraulic pressure actuator is a hydraulic pump or hydraulic cylinder. Also, the ESC motor 83 is, for example, a three-phase motor, and the ESC electric power converter 25 is a three-phase inverter circuit.

The brake control ECU 10 also includes an EPB control unit 40 and an EPB electric power converter 45 as components related to EPB control. The EPB control unit 40 drives the two EPB motors 71 and 72 by power supply from the EPB power converter 45, and locks the right and left rear wheels when parking. In this embodiment, the EPB motors 71 and 72 are configured to include DC motors. The EPB power converter 45 is configured to include a "three leg bridge circuit" which will be described later. A portion of the brake control ECU 10 that includes the EPB control unit 40 and the EPB electric power converter 45 is referred to as an "EPB motor control device 400."

A hydraulic pressure actuator 85 of the hydraulic pressure generator 80 is driven by the output of the ESC motor 83 and supplies braking hydraulic pressure to the front wheel brake units 95R and 95L and the rear wheel brake units 96R and 96L. The outputs of the first EPB motor 71 and the second EPB motor 72 respectively act on the rear wheel brake unit 96R and 96L during parking. A wheel speed sensor 97 detects the rotational speed of each wheel and notifies the brake control ECU 10 of the detected rotational speed.

Figure 2:
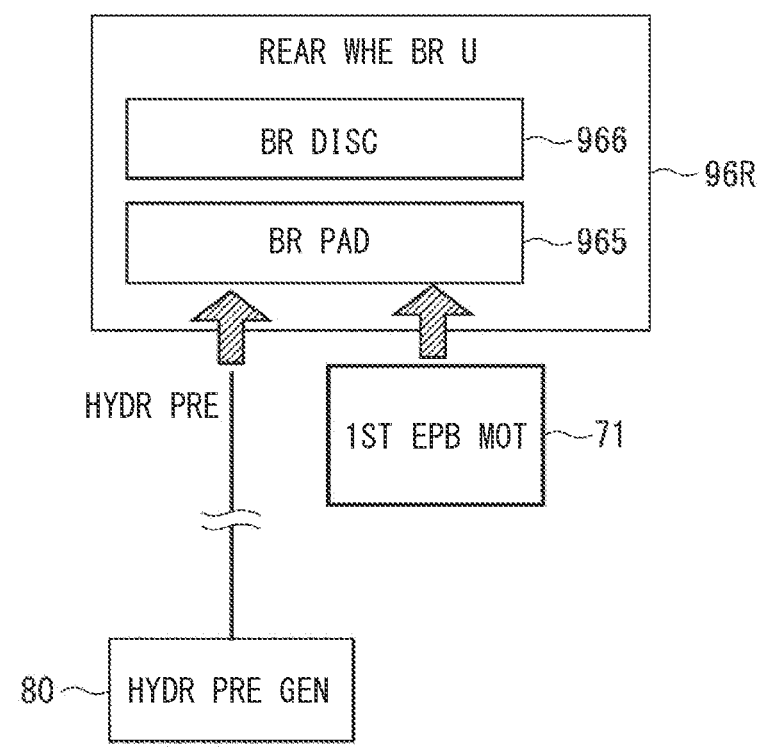
FIG. 2 is a diagram showing an enlarged view of Part II of FIG. 1.

FIG. 2 illustrates the configuration of the right rear wheel brake unit 96R. The brake pad 965 of the rear wheel brake unit 96R is pressed against the brake disc 966 by the output of the first EPB motor 71, thereby locking the wheels. In addition, the wheels are locked by pressing the brake pads 965 against the brake discs 966 by the hydraulic pressure supplied from the hydraulic pressure generator 80 throughout the stop and running operations.

[Configuration of EPB Motor Control Device]

Figure 3:
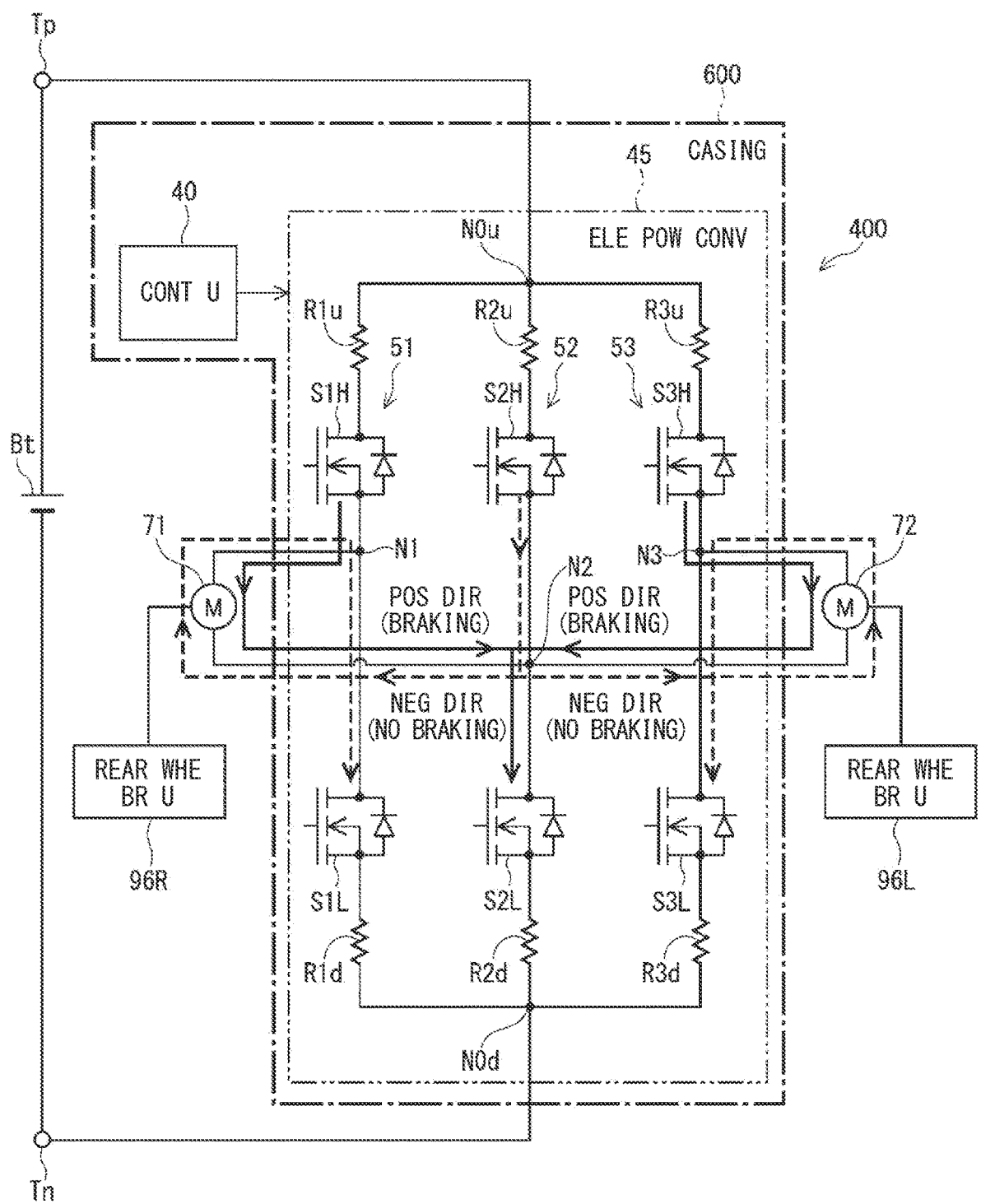
FIG. 3 is a configuration diagram of a motor control device according to each embodiment.

Next, referring to FIG. 3, the configuration of the EPB motor control device 400 will be described. Hereinafter, "EPB" in the element names in FIG. 1 will be omitted. In other words, the EPB motor control device 400, the EPB control unit 40 and the EPB electric power converter 45 are referred to as "motor control device 400", "control unit 40" and "electric power converter 45". Also, the first EPB motor 71 is referred to as "first motor 71", and the second EPB motor 72 is referred to as "second motor 72".

The control unit 40 includes a microcomputer, a driving circuit, and the like, and has a CPU, a ROM, a RAM, an I/O, a bus line connecting these configurations, and the like (not shown). The control unit 40 performs required control by executing software processing or hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit.

The electric power converter 45 has three legs, a first leg 51, a second leg 52 and a third leg 53, connected in parallel between a positive terminal Tp and a negative terminal Tn of the DC power supply Bt. The voltage of the DC power supply Bt is, for example, 12 [V]. The three legs 51, 52, 53 are housed in one casing 600 and mounted on the same substrate, for example. As described above, the electric power converter 45 is configured as a "three-leg bridge circuit" and can convert the electric power of the DC power supply Bt and supply the converted electric power to the first motor 71 and the second motor 72.

In the first leg 51, a positive switch element S1H connected to the positive terminal Tp and a negative switch element S1L connected to the negative terminal Tn are connected in series via an inter-element connection point N1. In the second leg 52, a positive switch element S2H connected to the positive terminal Tp and a negative switch element S2L connected to the negative terminal Tn are connected in series via an inter-element connection point N2. In the third leg 53, a positive switch element S3H connected to the positive terminal Tp and a negative switch element S3L connected to the negative terminal Tn are connected in series via an inter-element connection point N3. The positive switch elements S1H, S2H, S3H and the negative side switch elements S1L, S2L, S3L are configured by MOSFETs, for example.

The inter-element connection point N1 of the first leg 51 is connected to one terminal of the first motor 71. The inter-element connection point N3 of the third leg 53 is connected to one terminal of the second motor 72. The inter-element connection point N2 of the second leg 52 is connected to the other terminal of the first motor 71 and to the other terminal of the second motor 72. The control unit 40 operates the positive switch elements S1H, S2H, S3H and the negative switch elements S1L, S2L, S3L of the legs 51, 52, 53 to control the energization of the first motor 71 and the second motor 72.

A connection point on the positive terminal Tp side of the positive switch elements S1H, S2H, and S3H of the three legs 51, 52, and 53 is defined as a positive connection point N0u. A connection point on the negative terminal Tn side of the negative switch elements S1L, S2L, and S3L of the three legs 51, 52, and 53 is defined as a negative connection point N0d. In the configuration example of FIG. 3, between the element connection points N1, N2, N3 of each leg and the positive connection point N0u, and between the element connection points N1, N2, N3 of each leg and the negative connection point N0d, shunt resistors R1u, R1d, R2u, R2d, R3u, R3d as "current detectors" are arranged. Details regarding current detection will be described later. Note that the arrangement configuration of the shunt resistors in FIG. 3 corresponds to FIG. 14B.

Here, as indicated by the solid line arrow, the direction of current flowing from the positive switch element S1H of the first leg 51 through the first motor 71 to the negative switch element S2L of the second leg 52 is defined as the positive direction. Similarly, the direction of current flowing from the positive switch element S3H of the third leg 53 to the negative switch element S2L of the second leg 52 through the second motor 72 is defined as the positive direction.

Here, as indicated by the dashed line arrow, the direction of current flowing from the positive switch element S2 of the second leg 52 through the first motor 71 to the negative switch element S1L of the first leg 51 is defined as the negative direction. Similarly, the direction of current flowing from the positive switching element S2H of the second leg 52 through the second motor 72 to the negative switching element S3L of the third leg 53 is defined as the negative direction.

To "energize the first motor 71 and the second motor 72 in the positive direction" means that energization from the positive switching element 51H of the first leg 51 to the negative switching element S2L of the second leg 52 and energization from the positive switch element S3H of the third leg 53 to the negative switch element S2L of the second leg 52 are performed. To "energize the first motor 71 and the second motor 72 in the negative direction" means that energization from the positive switch element S2H of the second leg 52 to the negative switch element S1L of the first leg 51 and energization from the positive switch element S2H of the second leg 52 to the negative switch element S3L of the third leg 53 are performed.

In one configuration example, when the control unit 40 energizes in the positive direction, both the first motor 71 and the second motor 72 output torque in the braking direction, and when the control unit 40 energizes in the negative direction, both the first motor 71 and the second motor 72 output torque in the non-braking direction. When the motors 71, 72 output torque in the braking direction, the rear wheel brake units 96R, 96L lock the wheels, and when outputting torque in the non-braking direction, the rear wheel brake units 96R, 96L unlock the wheels.

In another configuration example, oppositely, when the control unit 40 energizes in the positive direction, both the first motor 71 and the second motor 72 may output torque in the non-braking direction, and when the control unit 40 energizes in the negative direction, both the first motor 71 and the second motor 72 may output torque in the braking direction.

In short, the motor control device 400 of this embodiment is designed so that when the control unit 40 is energized in the positive direction, the first motor 71 and the second motor 72 output torque in the same direction, either the braking direction or the non-braking direction. Further, when the control unit 40 energizes in the negative direction, the first motor 71 and the second motor 72 are configured to output torque in the direction opposite to when energized in the positive direction.

Figure 4:
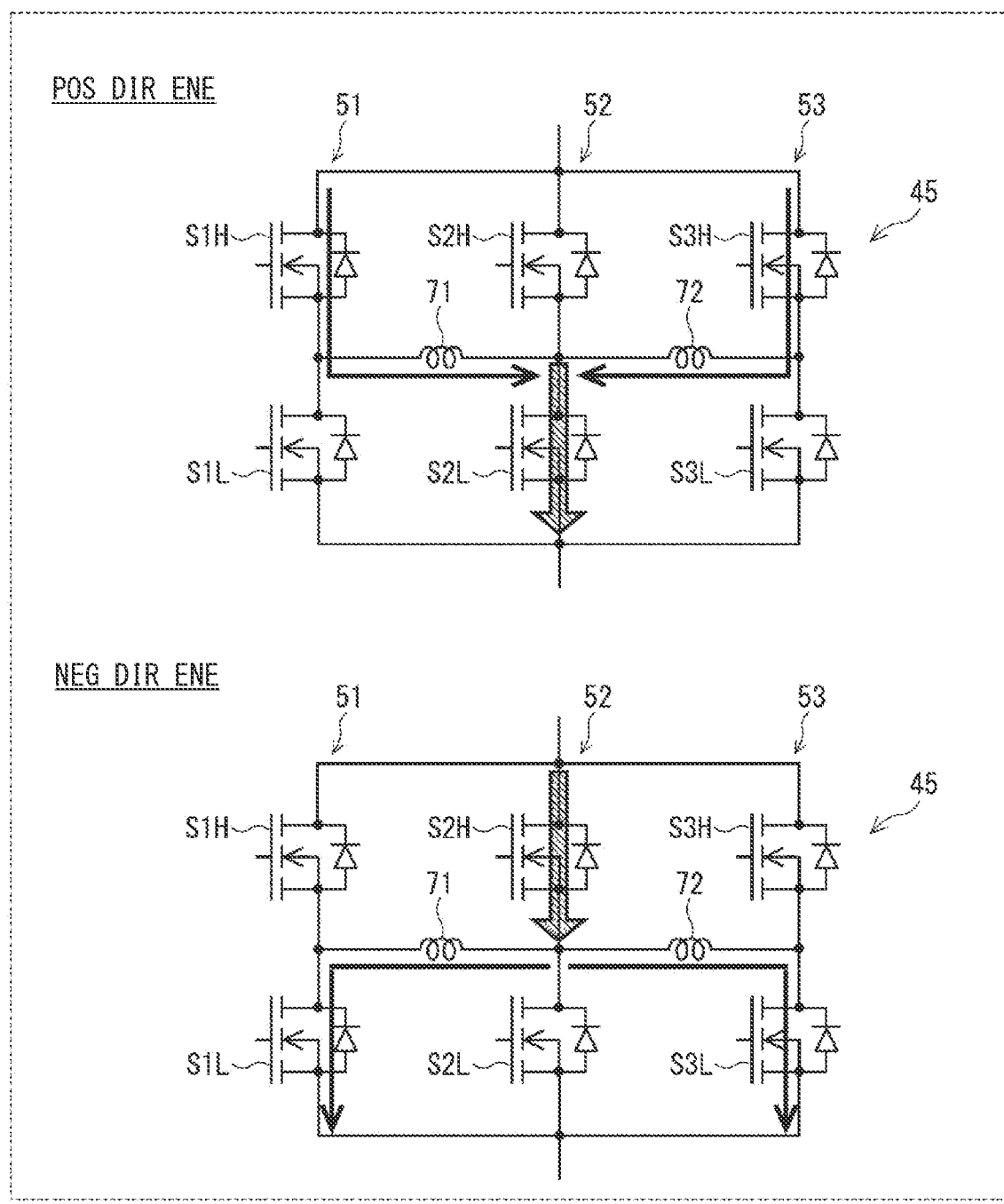
FIG. 4 is a diagram for explaining heat generation during positive direction energization and negative direction energization.

Next, with reference to FIG. 4, difficulties in the power converter 45 having a three-leg bridge circuit configuration will be described. The upper side of FIG. 4 shows the current path and the amount of current during positive direction energization, and the lower side shows the current path and current amount during negative direction energization. A thick block arrow indicates a large amount of current. In the three-leg bridge circuit, when the two motors 71 and 72 are energized at the same time, the current flowing through the switch elements S2H and S2L of the second leg 52, which is the shared leg, increases, and there may be a difficulty of failure due to heat generation.

Therefore, in the present embodiment, in a configuration in which one leg of a bridge circuit is shared by two DC motors, an object is to reduce heat generation in the shared leg. In the first and second embodiments, heat generation in the shared leg is reduced by changing the energization method. In the third and fourth embodiments, in addition to the energization method, measures in terms of hardware configuration are added.

First and Second Embodiments

The energization method according to the first and second embodiments will be described with reference to FIGS. 5 to 12, focusing on time charts. In the following description of the energization method, reference numerals for the control unit, the first to third legs, the first motor, the second motor, and the like will be omitted. The time charts of FIGS. 8 and 12 schematically show the operation using a time axis divided by unit time. One scale of the time axis corresponds to two units ($2\tau$) of the time unit [$\tau$], and even times such as t0, t2, . . . are marked on each scale. The points in the middle of each scale correspond to odd-numbered times.

It is assumed that the positive side and negative side switch elements are turned on and off complementarily, and the duty ratio of each leg on the vertical axis means "the ratio of the on time of the positive side switch element to the switching cycle". When the duty ratio is 0%, the positive side switch element is off and the negative side switch element is on, and when the duty ratio is 100%, the positive side switch element is on and the negative side switch element is off. Each time chart shows an example of energization in the positive direction when the duty ratio of the first leg and the third leg is 100%. Alternatively, the energization in the positive direction may be performed when the duty ratio of the first leg and the third leg is 0%. In that case, 100% and 0% in the drawing are reversed.

Figure 5:
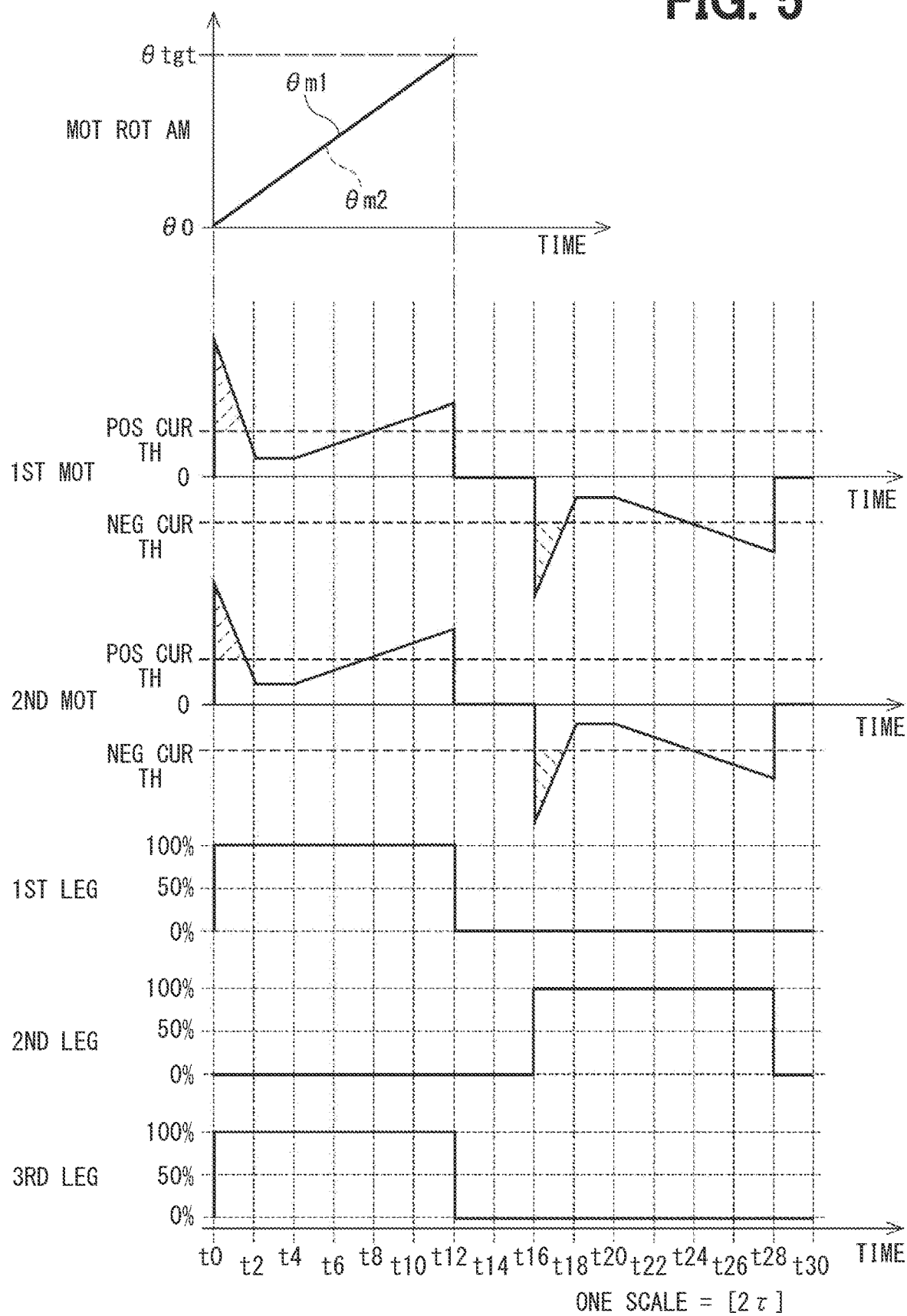
FIG. 5 is a time chart showing an energization method of comparison example 1.

Before describing the first and second embodiments, an energization method of a comparison example will be described with reference to the time charts of FIGS. 5 and 6. In the comparison example 1 shown in FIG. 5, each leg operates only at a duty ratio of 0% or 100%. That is, during rotation of each motor, the switch element in the corresponding leg is either always off or always on. Further, in the comparison example 1, the first motor and the second motor start rotating (that is, activated) at the same time from a stop state, and finish rotating at the same time.

During the period from time t0 to t12, the first and third legs are energized with a duty ratio of 100% and the second leg is energized with a duty ratio of 0%, and a positive current flows through the first and second motors. During the period from time t16 to t28, the first and third legs are energized with a duty ratio of 0% and the second leg is energized with a duty ratio of 100%, and a negative current flows through the first and second motors. As indicated by shaded areas, the absolute values of the positive current immediately after time t0 and the negative current immediately after time t16 exceed the current threshold.

That is, the current peak timings of the first motor and the second motor overlap, and a large current flows through the switch element of the second leg. The upper part of the drawing shows changes in the motor rotation amounts $\theta m1$ and $\theta m2$ when a positive current is applied. In the comparison example 1, the line representing the rotation amount $\theta m1$ of the first motor from the initial position $\theta 0$ to the control target $\theta tgt$ overlaps with the line representing the rotation amount $\theta m2$ of the second motor.

Figure 6:
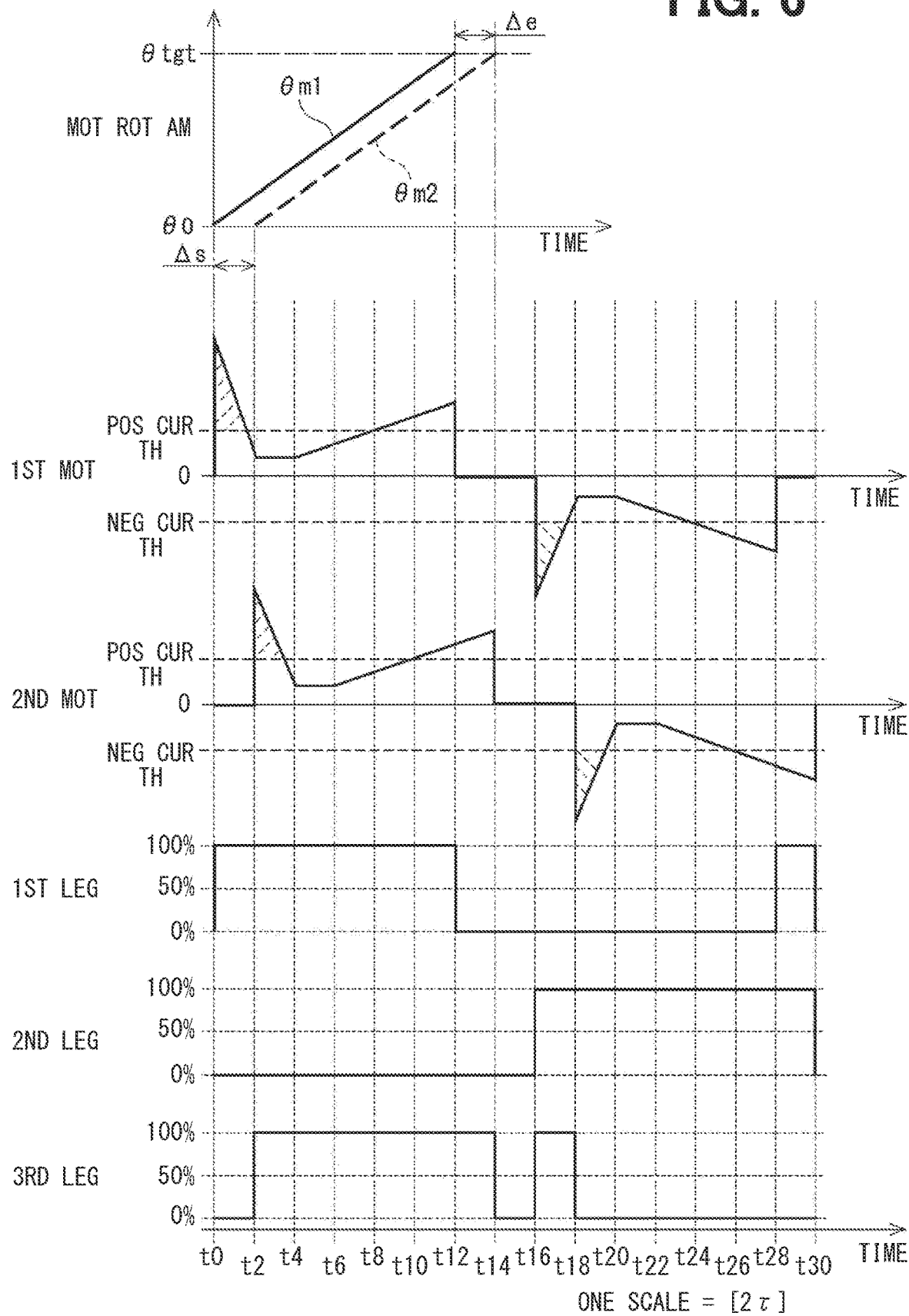
FIG. 6 is a time chart showing an energization method of comparison example 2.

In the comparison example 2 shown in FIG. 6, each leg operates only at a duty ratio of 0% or 100% as in the comparison example 1. Further, in the comparison example 2, the activation timings of the first motor and the second motor are shifted by $2\tau$ as a predetermined time. The significance of shifting the activation timing will be described later in the description of the first embodiment.

As a difference from the comparison example 1, the duty ratio of the third leg is 0% from time t0 to t2, 100% from time t12 to t14, and 100% from time t16 to t18. Also, the duty ratio of the first leg is 100% from time t28 to t30. As a result, a positive current flows through the first motor during the period from t0 to t12, while a positive current flows through the second motor during the period from t2 to t14. Further, negative current flows through the first motor during the period from time t16 to t28, while negative current flows through the second motor during the period from time t18 to t30.

In the comparison example 2, while maintaining the length ($12\tau$) of the energization period of the second motor, the energization period of the first motor is offset by a predetermined time. Therefore, the line of the rotation amount $\theta m1$ of the first motor from the initial position $\theta 0$ to the control target $\theta tgt$ and the line of the rotation amount $\theta m2$ of the second motor are parallel. That is, the end time difference $\Delta e$ has a length of $2\tau$ equal to the activation time difference $\Delta s$. Therefore, there may be a possibility that the braking timing of the right and left wheels in the EPB would be shifted.

Figure 7:
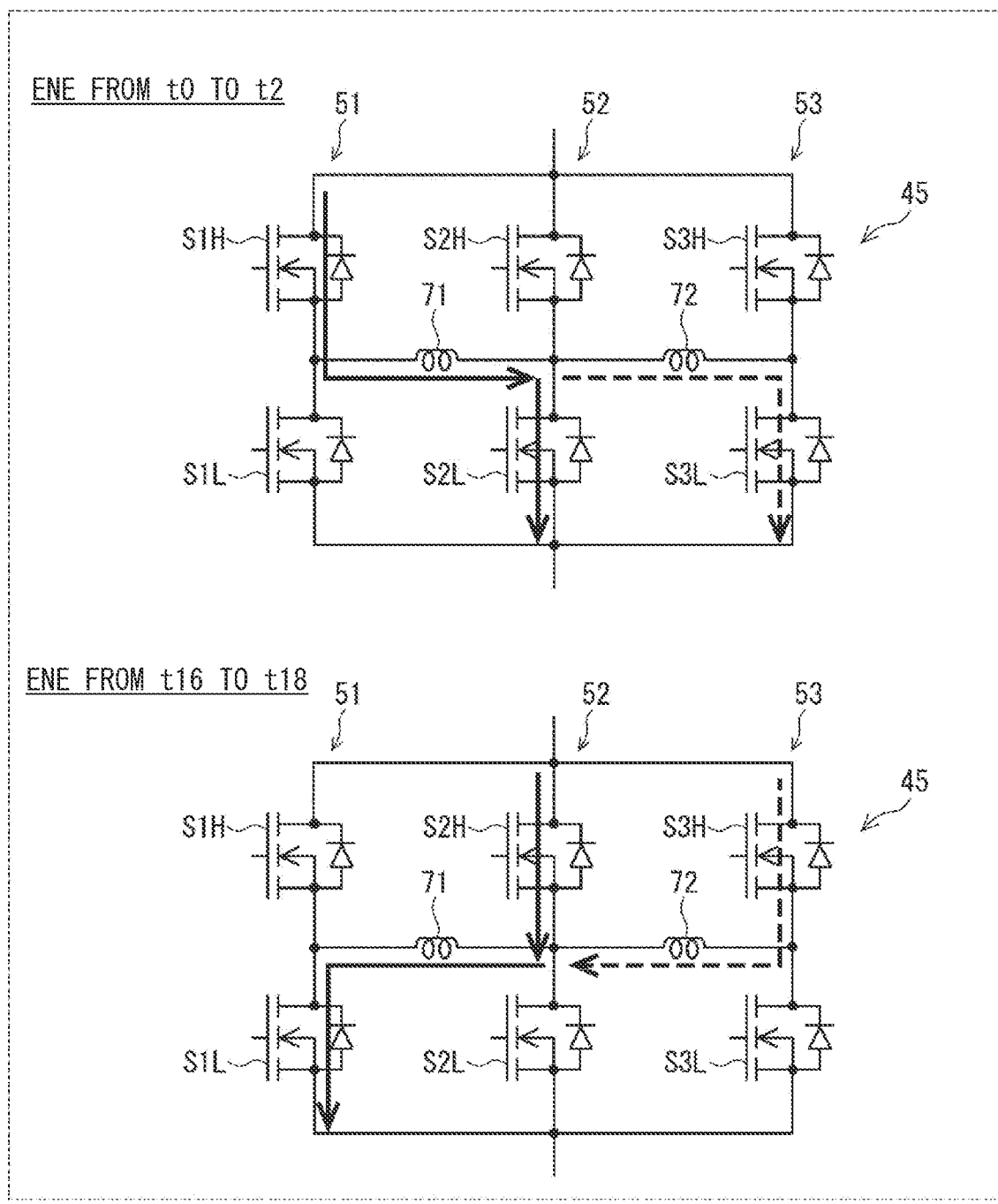
FIG. 7 is a diagram for explaining a switch operation in a period in which energization timing is shifted.
Figure 8:
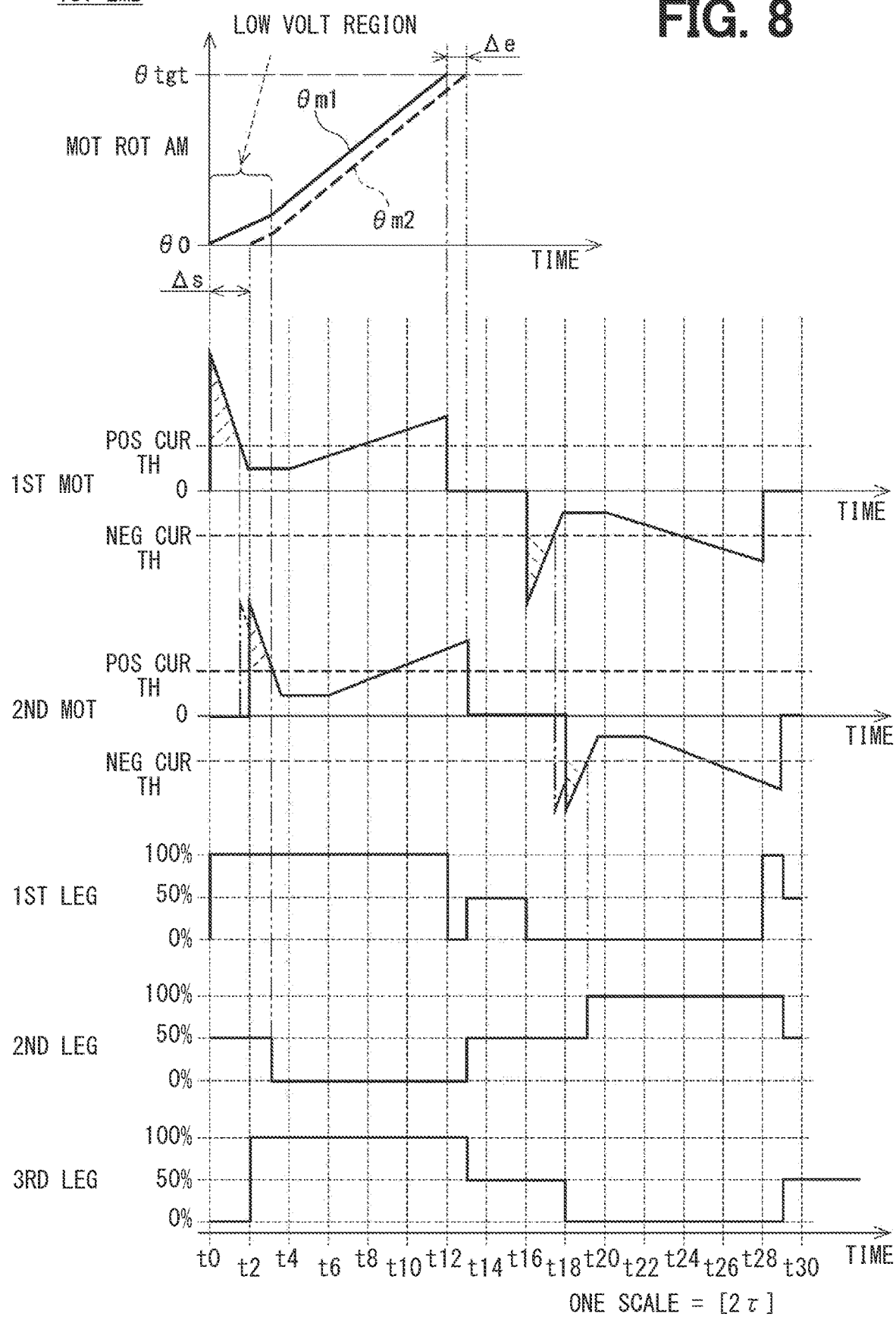
FIG. 8 is a time chart showing an energization method according to the first embodiment.

The details of the switch operation during the period in which the energization timing is shifted will be supplemented with reference to FIG. 7. Since the negative switch element S3L of the third leg is turned on during the period from time t0 to t2, a current path indicated by a dashed line is formed in the upper side of the drawing. Further, since the positive switch S3H of the third leg is turned on during the period from time t16 to t18, the current path indicated by the dashed line is formed in the lower side of the drawing. The similar feature is applied to the first leg in the period from time t12 to t14 and the period from time t28 to t30.

However, since the resistance of the switch element is much smaller than the resistance of the motor winding, the current flowing through the dashed line path is ignored in the comparison example 2. Here, if the current in the dashed line path cannot be completely ignored due to the resistance of the circuit, it may be possible to turn off both the positive switch element and the negative switch element of the first leg or the third leg during these periods.

Next, with reference to FIG. 8, the energization method of the first embodiment will be described. The format of the timing chart conforms to FIGS. 5 and 6 of the comparison example. First, as a matter common to the first and second embodiments, the control unit 40 starts energization when the EPB switch 94 is operated. For example, when the current flowing through the motor reaches a predetermined value or more, or the integrated value of the current reaches a predetermined value or more, the control unit 40 determines that the parking brake is sufficiently locked or unlocked, and terminates energization.

In this embodiment, in order to reduce heat generation in the shared leg, when the absolute value of the current flowing or estimated to flow in at least one of the first motor and the second motor exceeds the current threshold, the control unit switches and drives the positive switch element and the negative switch element of the second leg. The "flowing current" is determined based on the current detection value or estimated value by a current detector such as a shunt resistor, or the detected value or estimated value of other physical quantity correlated with the current.

The "current estimated to flow" means current expected based on circuit specifications and experimental data, or future current expected from changes in current detection values from the past to the present. For example, if it is known that the peak current when the motor is energized always exceeds the current threshold, the control unit may always perform switching drive operation when the motor is energized.

As described in the comparison example, in this energization method, a configuration is established in which the control unit performs a PWM control for each switch element of the power converter and performs the switching drive operation based on the duty ratio. For example, it is defined that the ratings of the positive switch element and the negative switch element of the second leg are the same, and that the heat receiving characteristics and the heat dissipation characteristics due to the substrate arrangement are also the same. In this case, it may be preferable to set the duty ratio of the switching drive operation to approximately 50% so that the on-state times of the positive switch element and the negative switch element are approximately the same.

Specifically, referring to FIG. 8, in the first embodiment, the duty ratio of the second leg is set to 50% during the period from time t0 to t3 and the period from time t11 to t19, and the switching drive operation is performed. In particular, the control unit of the first embodiment disperses current and heat by switching and driving the second leg once per one-directional energization, with reference to the second embodiment described below. When the motor starts to move, a large current flows, but the voltage is low. In other words, since a high voltage is not required at the start of energization, it is considered that setting the duty ratio of the second leg to 50% has no influence.

FIG. 9 shows the relationship between the applied voltage for energizing the motor and the torque-rotational speed characteristics. The torque at activation, i.e., when the rotation speed is 0, increases as the voltage increases. The high voltage region characteristics at voltage of V are indicated by a line connecting no-load rotation speed No and activation torque Ts. The low voltage region characteristics at voltage of ½V are indicated by a line connecting the no-load rotational speed (No/2) and the activation torque (Ts/2). Therefore, if the required torque at activation is (Ts/2), activation is possible with a duty ratio of 50%. Further, as indicated by the arrow, by changing the duty ratio to 100% after activation, it is possible to shorten the time required to lock and secure the lock torque equivalent to that of the above-described comparison example.

Further, the control unit energizes the first motor and the second motor so as to shift the timing of the current peaks. Specifically, the control unit shifts the activation timing of the first motor and the second motor from stop to rotation. In the example shown by the solid line in FIG. 8, the control unit activates the first motor at time t0 and activates the second motor at time t2 after a predetermined time 2τ during positive direction energization. Further, the control unit activates the first motor at time t16 during negative direction energization, and activates the second motor at time t18 after a predetermined time 2τ. This feature is the same as the comparison example 2 shown in FIG. 6. Thus, the amount by which the activation timing is shifted may be a fixed value.

Alternatively, as indicated by the two-dot chain line, when the absolute value of the current of one of the first motor and the second motor (in this example, the first motor) that has started to be energized first exceeds the threshold value temporarily, and then, falls below the threshold, the control unit may start energizing the other motor (i.e., the second motor in this example).

Further, in the example of FIG. 8, the control unit shifts the duty ratio of the second leg from 50% to 0% at time t3 when the positive current value of the second motor falls below the threshold, and changes the duty ratio of the second leg from 50% to 100% at time t19 when the absolute value of the negative current falls below the threshold. Not limited to this example, the timing of shifting the duty ratio from 50% to 0% or 100% may be set to a fixed value.

Furthermore, in the example of FIG. 8, the first leg 51 and the third leg 53, which are non-shared legs, are also switched and driven at a duty ratio of 50% during the period from time t13 to t16 when the positive energization shifts to the negative energization. During the period from time t13 to t16, the three legs 51, 52, 53 are synchronously switched and driven, so that no current flows through the motors 71, 72. Note that during the period from t12 to t13 when the duty ratio of the first leg 51 is 0% and the period from t28 to t29 when the duty ratio of the third leg 53 is 100%, the current along the dashed line path in FIG. 7 is ignored as in the comparison example 2.

In the diagram showing the changes in the motor rotation amounts θm1 and θm2 during the positive direction energization, since the voltage is low during the period from time t0 to t3 when the duty ratio of the second leg is 50%, the slope of changes in the motor rotation amounts θm1 and θm2 becomes relatively small. Therefore, the motor rotation amounts θm1 and θm2 appear as broken lines. In addition, a period in which the duty ratio of the second leg is 50% is provided in comparison with the comparison example 2, and the proportion of the second motor driven with a duty ratio of 100% is greater than that of the first motor. Therefore, the rotation amount θm2 of the second motor increases faster than the rotation amount θm1 of the first motor, and the end time difference Δe(1τ) to reach the control target θtgt becomes smaller than the activation time difference Δs(2τ).

As described above, in the first embodiment, one of the positive switch element and the negative switch element of the second leg is not always turned on, but it is switched and driven so that the return current flows. As a result, even if the maximum instantaneous current does not change, the flowing current is shared temporally by both switch elements, so that heat generation per element can be reduced. Further, by setting the duty ratio of the switching drive operation to 50%, the heat generation of the positive side switch and the negative side switch becomes almost equal, and the heat generation peak can be effectively reduced. In other words, switching is performed so that the temperatures of the positive switch element and the negative switch element approach each other.

Moreover, it may be preferable that the switching drive operation is performed only during a period when the current value is large and the voltage is low. If switching drive operation is performed in a low-current high-rotation region, the motor rotation speed may decrease. Therefore, by performing the switching drive operation only during the period when the current value is large and the voltage is low, it is possible to suppress the decrease in the motor rotation speed in the low current high rotation region.

Furthermore, in the first embodiment, the maximum instantaneous current can be reduced by shifting the energization timings so that the timings at which the drive currents of the motors are large do not overlap. Therefore, heat generation in the second leg is suppressed. Also, by energizing so that the end time difference Δe is smaller than the activation time difference Δs, even if the start timing is shifted, the difference in brake timing between the right and left wheels in the EPB can be reduced.

Next, the flow charts of FIGS. 10 and 11 show the energization method according to this embodiment. In the following flowchart, a symbol S indicates a step. In S11 of FIG. 10, the control unit determines whether the absolute value of the current flowing or estimated to flow in at least one of the first motor and the second motor exceeds the current threshold.

When the determination in S11 is "yes", in S12 the control unit performs switching drive operation so that the temperatures of the positive side switch S2H and the negative side switch S2L of the second leg approach each other. Specifically, the control unit switches and drives the second leg at a duty ratio of 50%, for example. In the case of "no" in S11, in S13, the control unit performs fixed energization to the second leg, that is, energization corresponding to a duty ratio of 0% or 100%.

In S21 of FIG. 11, it is determined whether the EPB switch has been operated. When "yes", the process proceeds to S22 to start driving the first motor and the second motor simultaneously. In S22, the control unit energizes the first motor and the second motor so as to shift the timing of the current peak, specifically, the activation timing from stop to rotation. At this time, it may be shifted by a predetermined time. Alternatively, when the absolute value of the current of one of the motors to which energization has started earlier exceeds the threshold value temporarily and then falls below the threshold, energization of the other motor may be started.

Second Embodiment

Next, with reference to FIG. 12, the energization method of the second embodiment will be described. In the second embodiment, the second leg is switched and driven to dissipate the current and heat by switching the second leg twice, at the initial stage and the final stage, per one-directional energization.

It is the same as the first embodiment shown in FIG. 8 in that the second leg is switched at a duty ratio of 50% during the period from t0 to t3 in the positive direction energization. In the subsequent end of energization, the positive current exceeds the current threshold during the period from t8 to t12 for the first motor and from t10 to t14 for the second motor. Therefore, the control unit further switches and drives the second leg at a duty ratio of 50% during the period from t8 to t14. As a result, the second leg continues the switching operation with a duty ratio of 50% over the period from t8 to t19 after the period in which both motors are stopped.

Similarly, during the negative direction energization, the absolute value of the negative current exceeds the current threshold during the period from t24 to t28 for the first motor and from t26 to t30 for the second motor at the end of the energization. Therefore, the control unit further switches and drives the second leg at a duty ratio of 50% for a period after t24. In the second embodiment, it is possible to further reduce heat generation in the second leg due to the large current in the final stage of the energization, as compared with the first embodiment.

[Arrangement Example of Current Detector]

Next, with reference to FIGS. 13A to 17C, an example arrangement of shunt resistors as "current detectors" will be described. In this embodiment, the current detector is used for current detection to determine whether the switching drive operation of the second leg 52 is implemented. Regarding the code of the shunt resistor arranged in each leg, the first letter is "R", the second letter is the number of the leg, and the third letter is "u" for the positive side and "d" for the negative side. A shunt resistor arranged between the positive side connection point N0$u$ of the three legs and the positive terminal Tp is represented as a "positive path shunt resistor R0$u$", and a shunt resistor arranged between the negative side connection point N0$d$ of the three legs and the negative terminal Tn is represented as "the negative path shunt resistor R0$d$".

The symbols of the shunt resistors connected in series with the motors 71 and 72 are defined as "Rm1 and Rm2". A current flowing through each shunt resistor is represented by a symbol in which "R" of the shunt resistor is replaced with "I". The current flowing through the shunt resistor R0$u$ in the positive path is called "total positive current I0$u$", and the current flowing through the shunt resistor R0$d$ in the negative path is called "total negative current I0$d$".

FIGS. 13A and 13B show a configuration for directly detecting the first motor current Im1 and the second motor current Im2 as an arrangement example of the first category. In the basic configuration 461 shown in FIG. 13A, one shunt resistor Rm1 is arranged in series with the first motor 71 between the inter-element connection point N1 of the first leg 51 and the inter-element connection point N2 of the second leg 52. Another shunt resistor Rm2 is arranged in series with the second motor 72 between the inter-element connection point N3 of the third leg 53 and the inter-element connection point N2 of the second leg 52. Hereinafter, "configuration" such as "basic configuration 461" means a three leg bridge circuit (or a power converter).

In a configuration 462 of FIG. 13B, a positive path shunt resistor R0$u$ and a negative path shunt resistor R0$d$ are added to the basic configuration 461. A first motor current Im1 is detected by a shunt resistor Rm1, and a second motor current Im2 is detected by a shunt resistor Rm2.

FIGS. 14A to 14C show an arrangement example of the second category, in which the currents flowing through the first leg 51 and the third leg 53 are detected, and the first motor current Im1 and the second motor current Im2 are calculated from the detected currents. In the basic configuration 471 shown in FIG. 14A, shunt resistors R1$u$, R1$d$, R3$u$, and R3$d$ are arranged at four locations between the inter-element connection points N1, N3 of the first leg 51 and the third leg 53 and the positive side connection point N0$u$, and between the inter-element connection points N1, N3 of the first leg 51 and the third leg 53 and the negative side connection point N0$d$. In another arrangement example of the second category, the shunt resistor may be arranged between the inter-element connection point of at least two legs among the three legs 51, 52, 53 and the positive side connection point N0$u$, and between the inter-element connection point of at least two legs and the negative connection point N0$d$.

Currents I1$u$, I1$d$, I3$u$ and I3$d$ are detected by the shunt resistors R1$u$, R1$d$, R3$u$ and R3$d$. Motor currents Im1 and Im2 are calculated by equations (1.1) and (1.2).

$$\text{Im}1 = I1u - I1d \tag{1.1}$$

$$\text{Im}2 = I3u - I3d \tag{1.2}$$

In the basic configuration 471, the currents I2$u$ and I2$d$ of the second leg 52 are not directly detected, and can be calculated by the following equations. When the equation of "Im1+Im2≥0" is satisfied, the positive side current I2$u$ of the second leg 52 is represented by equation (2.1a) according to the switching timing of the negative side switching element S2L. Negative current I2$d$ is represented by equation (2.2).

$$I2u = 0 (\text{when } S2L \text{ is on}) = -Im1 - Im2 (\text{when } S2L \text{ is off}) \tag{2.1a}$$

$$I2d = Im1 + Im2 + I2u \tag{2.2}$$

When the equation of "Im1+Im2<0" is satisfied, the positive current I2u of the second leg 52 is represented by the equation (2.1b) according to the switch timing of the positive switching S2H. Negative current I2d is represented by equation (2.2).

$$I2u = -Um1 - Im2 \text{(when } S2H \text{ is on)} = 0 \text{(when } S2H \text{ is off)} \quad (2.1b)$$

$$I2d = Im1 + Im2 + I2u \quad (2.2)$$

In the configuration 472 of FIG. 14B, shunt resistors R2u and R2d are added to the basic configuration 471 at two locations between the inter-element connection point N2 of the second leg 52 and the positive side connection point N0u and between the inter-element connection point N2 of the second leg 52 and the negative side connection point N0d. Thus, the currents I2u, I2d in the second leg 52 are directly detected.

In a configuration 473 of FIG. 14C, a positive path shunt resistor R0u and a negative path shunt resistor R0d are added to the basic configuration 471, and the positive total current I0u and the negative total current I0d are detected. The currents I2u and I2d of the second leg 52 can also be calculated by equations (3.1) and (3.2).

$$I2u=I0u-I1u-I3u \quad (3.1)$$

$$I2d=I0d-I1d-I3d \quad (3.2)$$

Next, FIGS. 15A to 17C show other layout examples of shunt resistors. Other arrangement examples are not limited to the configuration capable of calculating the motor currents Im1 and Im2. The arrangement examples in FIGS. 13A-14C are comprehensively summarized such that the shunt resistor is arranged in series with one or more of the positive or negative switch elements of any of the three legs 51, 52, 53, or arranged in series with one or more of the first motor 71 or the second motor 72. It is understood that the shunt resistors R0u, R0d of the positive path and the negative path are provided in series commonly to the positive side switch element or the negative side switch element of the three legs 51, 52, 53. In FIGS. 15 to 17, the symbols of the connection points N1, N2, N3, N0u, and N0d are omitted.

In configuration 481 of FIG. 15A, shunt resistors R1d, R2d, R3d are provided in series with the negative switch elements S1L, S2L, S3L of each leg. In configuration 482 of FIG. 15B, a shunt resistor R0u in the positive path is further added to the configuration 481.

In configuration 483 of FIG. 16A, shunt resistors R1u, R2u, R3u are provided in series with the positive switch elements S1H, S2H, S3H of each leg. In configuration 484 of FIG. 16B, a shunt resistor R0d in the negative path is further added to the configuration 483.

In configuration 485 of FIG. 17A, shunt resistors R0u and R0d of the positive path and the negative path are provided. In configuration 486 of FIG. 17B, only the positive path shunt resistor R0u is provided. In configuration 487 of FIG. 17C, only the negative path shunt resistor R0d is provided.

Third and Fourth Embodiments

Next, with reference to FIGS. 18 and 19, third and fourth embodiments will be described in which, in addition to the energization methods according to the first and second embodiments, measures for reducing heat generation in terms of hardware configuration are added. The third and fourth embodiments focus on the feature such that the second leg, which is a shared leg, to generate more heat than the first and third legs, which are non-shared legs.

In the third embodiment, regarding the current or temperature ratings of the positive side switch element and the negative side switch element, the rating of the element of the second leg 52 is set higher than the rating of the elements of the first leg 51 and the third leg 53. As shown in FIG. 18, the current rating of the elements in the second leg 52 is approximately twice the current rating of the elements in the first leg 51 and the third leg 53. Alternatively, the temperature rating of the elements in the second leg 52 is higher than the temperature rating of the elements in the first leg 51 and the third leg 53. Specifically, an element having a physical size larger than that of the first leg 51 and the third leg 53 is used as the element of the second leg 52.

As a result, the circuit area and cost can be reduced compared to uniformly increasing the ratings of all elements in accordance with the required specifications of the second leg 52. In addition, when a thermal failure occurs, one of the first leg 51 or the third leg 53 is estimated to fail first. Thus, it is possible to lower the possibility such that two motors 71 and 72 are not operable at the same time due to the one failure.

In the fourth embodiment, regarding the arrangement of the legs on the substrate, the second leg 52 is arranged at a location that receives less heat or has better heat dissipation than the first leg 51 and the third leg 53. For example, as shown in FIG. 19, a heat sink (or a connector) 58 is provided at one end of the substrate 50, and a second leg 52 and a first leg 51 and a third leg 53 are arranged in the vicinity thereof from the heat sink (or connector) 58 side, in this order. On the side of the third leg 53 opposite to the heat sink (or connector) 58, another heat-generating component 59 (for example, a shunt resistor, or the like) is arranged.

the second leg 52 is arranged such that the distance D21 between the second leg 52 and the first leg 51 and the distance D23 between the second leg 52 and the third leg 53 are larger than the distance D13 between the first leg 51 and the third leg 53 (i.e., the equations of D21>D13, and D23>D13 are satisfied). That is, the second leg 52 is arranged at a location where the heat is least received with respect to the mutual heat reception between the three legs 51, 52, 53 and the heat reception from the other heat-generating component 59.

In addition, the second leg 52 is arranged at a location closer to the heat sink (or connector) 58 than the first leg 51 and the third leg 53, that is, at a location with good heat dissipation. In the fourth embodiment, by designing the substrate arrangement so as to be advantageous for heat generation reduction and heat dissipation of the second leg 52, even when combined with the third embodiment, the increase in the rating of the elements of the second leg 52 is reduced. Alternatively, it is permissible to use elements of the same rating for all legs 51, 52, 53 without combination with the third embodiment.

Other Embodiments (a) The duty ratio in the switching drive operation of the second leg may not be limited to 50%, and may be any value greater than 0% and less than 100%. For example, the duty ratio may be set such that the temperatures of the positive side switch element and the negative side switch element of the second leg are approximately the same. Specifically, considering the difference in heat reception characteristics due to the heat generation of peripheral elements according to the layout of the substrate, the heat generation of the elements on the side that easily receives heat is reduced, and the more current flows in the elements on the side that are less likely to receive heat. Thus, overall optimization is established.

(b) The switching drive control method may not be limited to PWM control. For example, one of preset switching patterns may be selected according to conditions.

(c) When the non-shared leg is duty-driven in addition to the shared leg, the switching frequency of the shared leg may be less than that of the non-shared leg. As a result, switching loss in the shared leg is relatively reduced, and heat generation in the shared leg can be suppressed more effectively. Alternatively, instead of reducing the number of times of switching, the carrier frequency may be lowered, or predetermined duty driving may be repeated in synchronization with the carrier.

(d) In the above embodiment, in addition to detecting or calculating the motor current based on the current detection value of the shunt resistor and the like, a temperature detector may be used to detect the environmental temperature and the temperature of the switch element. For example, depending on the environmental temperature and the temperature of the switch element, the higher the temperature, the lower the current threshold, and the second leg may be switched and driven more effectively.

(e) Current detectors may not be limited to shunt resistors, and other current detectors may be used.

The present disclosure is not limited to such embodiments but can be implemented in various forms without deviating from the spirit of the present disclosure.

The controllers (control units) and method described in the present disclosure may be implemented by a special purpose computer which is configured with a memory and a processor programmed to execute one or more particular functions embodied in computer programs of the memory. Alternatively, the controllers (control units) described in the present disclosure and the method thereof may be realized by a dedicated computer configured as a processor with one or more dedicated hardware logic circuits. Alternatively, the controllers (control units) and the method according to the present disclosure may be achieved using one or more dedicated computers constituted by a combination of the processor and the memory programmed to execute one or more functions and the processor with one or more hardware logic circuits. The computer program may be stored in a computer-readable non-transitional tangible recording medium as an instruction executed by a computer.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A motor control device for driving a first motor and a second motor that output torque in a braking direction or a non-braking direction according to a direction of energization in a vehicle brake device, the motor control device comprising:

an electric power converter that is accommodated in a casing, converts an electric power of a direct current power supply to supply the electric power to the first motor and the second motor, and includes three legs of a first leg, a second leg and a third leg that are connected in parallel between a positive terminal and a negative terminal of the direct current power supply, each of the three legs having a positive switch element connected to the positive terminal and a negative switch element connected to the negative terminal that are connected to each other in series via an inter-element connection point; and a control unit that operates the positive switch element and the negative switch element of each leg to control the energization of the first motor and the second motor, wherein:

the inter-element connection point of the first leg is connected to one terminal of the first motor;

the inter-element connection point of the third leg is connected to one terminal of the second motor;

the inter-element connection point of the second leg is connected to another terminal of the first motor and another terminal of the second motor;

when the control unit energizes from the positive switch element of the first leg to the negative switch element of the second leg, and energizes from the positive switch element of the third leg to the negative switch element of the second leg, the first motor and the second motor are configured to output the torque in a same direction of either the braking direction or the non-braking direction; and when an absolute value of current flowing or estimated to flow in at least one of the first motor and the second motor exceeds a current threshold, the control unit switches and drives the positive switch element and the negative switch element of the second leg.

2. The motor control device according to claim 1, wherein:

the control unit switches and drives the second leg to bring temperature of the positive switch element and temperature of the negative switching element closer to each other.

3. The motor control device according to claim 2, wherein:

the control unit performs PWM control of each switch element of the power converter; and the control unit sets a duty ratio of the second leg, which is a ratio of an on time of the positive switch element to a switching period of the second leg, to a value greater than 0% and less than 100%.

4. The motor control device according to claim 1, wherein:

the control unit energizes the first motor and the second motor to shift a timing of a current peak.

5. The motor control device according to claim 4, wherein:

the control unit shifts activation timings of the first motor and the second motor from stop to rotation by a predetermined time.

6. The motor control device according to claim 4, wherein:

when the absolute value of the current of the one of the first motor and the second motor, to which energization is started earlier, exceeds the current threshold temporarily and then falls below the current threshold, the control unit starts energizing the other of the first motor and the second motor.

7. The motor control device according to claim 1, wherein:
the second leg is arranged at a location that receives less heat or has better heat dissipation than the first leg and the third leg.

8. The motor control device according to claim 7, wherein:
the second leg is arranged that a distance between the second leg and the first leg and a distance between the second leg and the third leg are equal to or larger than a distance between the first leg and the third leg.

9. The motor control device according to claim 7, wherein:
the second leg is arranged closer to a heat sink or a connector than the first leg and the third leg.

10. The motor control device according to claim 1, further comprising:
at least one current detector disposed in series with one or more of the positive switch element or the negative switch element of any one of the three legs, or in series with one or more of the first motor or the second motor.

11. The motor control device according to claim 10, wherein: the at least one current detector includes: one current detector arranged in series with the first motor between the inter-element connection point of the first leg and the inter-element connection point of the second leg; and another current detector arranged in series with the second motor between the inter-element connection point of the third leg and the inter-element connection point of the second leg.

12. The motor control device according to claim 10, wherein:
a connection point on a positive terminal side of the positive switch elements of the three legs is defined as a positive connection point;
a connection point on a negative terminal side of the negative switch elements of the three legs is defined as a negative connection point; and
the current detector is arranged between the inter-element connection point and the positive connection point of at least two of the three legs, and arranged between the inter-element connection point and the negative connection point of at least two of the three legs.

13. The motor control device according to claim 1, wherein:
a rating of the current or temperature of the positive switch element and the negative switch element is set that the rating of each switch element of the second leg is higher than the rating of each switch element of the first leg and the third leg.

* * * * *